(12) United States Patent
Fukunaga et al.

(10) Patent No.: US 7,675,738 B2
(45) Date of Patent: Mar. 9, 2010

(54) GAS INSULATED SWITCHGEAR

(75) Inventors: Masayuki Fukunaga, Kanagawa (JP);
Masayuki Kosakada, Tokyo (JP);
Nobuaki Okanari, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 414 days.

(21) Appl. No.: 11/776,198

(22) Filed: Jul. 11, 2007

(65) Prior Publication Data
US 2008/0049383 A1    Feb. 28, 2008

(30) Foreign Application Priority Data
Jul. 12, 2006    (JP)    ............... 2006-191221

(51) Int. Cl.
*H05K 7/20*    (2006.01)
(52) U.S. Cl. ............... 361/612; 361/604; 361/618; 218/10; 218/79; 218/159
(58) Field of Classification Search ........... 361/604, 361/612, 618

See application file for complete search history.

(56) References Cited

U.S. PATENT DOCUMENTS
4,821,141 A    4/1989    Torimi et al.

FOREIGN PATENT DOCUMENTS
JP    2-023008    1/1990

*Primary Examiner*—Jayprakash N Gandhi
*Assistant Examiner*—Courtney Smith
(74) *Attorney, Agent, or Firm*—Foley & Lardner LLP

(57) ABSTRACT

A gas insulated switchgear has: circuit breakers, circuit breaker vessels, first disconnector and maintenance earthning switches connected to first bus bars connected to circuit breaker vessels and also to main bus bars, second disconnector and maintenance earthning switches connected to second bus bars connected to the circuit breaker vessels, circuit breaker operating mechanisms, first and second disconnector and maintenance earthning switch operating mechanisms, and first and second disconnector and maintenance earthning switch operation links for linking the disconnector and maintenance earthning switches and the operating mechanisms for three phases. The second disconnector and maintenance earthning switch operation links are arranged so as to pass through inter-phases of the first bus bars and the operating panels of the circuit breaker operating mechanism and the first and second disconnector and maintenance earthning switch operating mechanisms of each phase are arranged on a common flat plane.

10 Claims, 21 Drawing Sheets

GAS INSULATED SWITCHGEAR

CROSS-REFERENCE TO RELATED APPLICATIONS

This application is based upon and claims the benefits of priority from the prior Japanese Patent Application No. 2006-191221, filed on Jul. 12, 2006; the entire content of which is incorporated herein by reference.

BACKGROUND OF THE INVENTION

1. Field of the Invention

This invention relates to a phase isolated type gas insulated switchgear containing components of each of three phases in separate vessels.

2. Description of the Related Art

Generally, gas insulated switchgears comprise devices containing a charging unit in a hermitically sealed metal vessel along with a highly insulating and arc-extinction insulation medium such as SF6 gas. If compared with air insulated switchgears, gas insulated switchgears can be remarkably downsized and hence can reduce the area of the installation site to a large extent by three-dimensionally arranging the circuit breakers, disconnectors and other required devices in order to reduce the gaps separating the devices. Additionally, since a gas insulated switchgear has a hermetically sealed structure, it provides an advantage of being scarcely influenced by external factors. For those reasons, gas insulated switchgears are being employed in substations and switching stations in and near large cities and also in costal regions from the viewpoint of poor availability of land and prevention of damages due to briny air.

Gas insulated switchgears of the categories of 72 kV to 300 kV containing the components of the three phases in a common vessel are being employed. However, in the voltage category of 240 kV and above, switchgears where the components of each of the three phases are separated from the components of the other phases are being popularly used in order to prevent problems of short-circuiting from taking place among the phases if a fault has occurred, because of the significance of such switchgears.

Such a phase isolated type gas insulated switchgear is typically connected to an operating mechanism comprising a power source and a control circuit of the power source for driving the internal electrodes of the circuit breakers. Similarly, the disconnector and maintenance earthning switch for the bus bar, the disconnector for the bus bar and the disconnector and maintenance earthning switch for the feeder line are connected to an operating mechanism for the disconnector and maintenance earthning switch, or an operating mechanism for the disconnector, whereas the fast earthning switch for the feeder line is connected to an operating mechanism for the fast earthning switch.

The inside of a gas insulated switchgear is filled with a gaseous insulating medium. The switchgear is equipped with a gas gauge for monitoring the pressure or the density of the internal gaseous insulating medium, because the insulation performance of the switchgear relies on the pressure or the density of the gaseous insulating medium. When a fast earthning switch is contained in a same gas division with a disconnector and maintenance earthning switch for a feeder line, a common gas gauge is used for monitoring the pressure or the density.

The operating mechanism needs to be driven or serviced by an operator and the reading of the gas gauge needs to be visually checked by the operator when driving or servicing, whichever appropriate, the gas insulated switchgear so that the gas gauge should be accessible to men.

As gas insulated switchgears are downsized in pursuit of economy, it becomes difficult to secure a space for monitoring and servicing operations where the operator can access and service the gas insulated switchgear. The net result is a degraded serviceability/operability. Differently speaking, the efforts for downsizing gas insulated switchgears confront limitations because a space needs to be secured for servicing operations. Thus, the need of such a space makes it difficult to realize an economic gas insulated switchgear.

A local control panel of a conventional gas insulated switchgear is normally separated from the switchgear itself. The local control panel contains the operation handles, or the switches, of the circuit breaker, the disconnector and the earthning switch of the feeder line and the circuits that electrically realize the interlocking requirements of the feeder line. The local control panel also contains a circuit for receiving and displaying electric signals from the detector for electrically detecting a defective condition of the gas insulated switchgear that may be a gas pressure decrease or a gas density decrease. The local control panel additionally contains an electric/electronic circuit for electrically transmitting information to the host system, a circuit for transmitting signals for driving the switches of the feeder line in response to a switch operation command from the host system, a power supply distributing circuit to be used to control/operate the feeder line.

Then, the operating mechanisms of all the circuit breakers, the disconnector and maintenance earthning switches and other devices and the gas gauge of the feeder line are electrically connected to the local control panel for controlling/monitoring the feeder line by way of a low voltage control cable. Ducts, trays, wire tubes and other incidental equipment for supporting and/or protecting the low voltage control cable are arranged between the gas insulated switchgear main body and the local control panel. A space is secured to install and operate the local control panel itself.

Japanese Patent Application Laid-Open Publication No. 2-23008 (the entire content of which is incorporated herein by reference) discloses a gas insulated switchgear that is devised to save space and show improved operability/serviceability. In the gas insulated switchgear disclosed in the above-cited Japanese Patent document, the disconnector and maintenance earthning switches are contained in the circuit breaker vessel and the tube table for leading out the drive shaft is extended so as to arrange the operating mechanisms to the front surface of the switchgear in a concentrated manner. However, the disclosed switchgear is of the three-phase common type and cannot be applied straightly to a switchgear where the disconnectors and the circuit breakers of each phase are separated from those of the other phases by gas compartments. Additionally, it is not possible to arrange the operating mechanisms in parallel in a horizontal direction with disclosed technique. Therefore, if the operating mechanisms of a phase isolated type gas insulated switchgear are arranged in a concentrated manner, the height of the operating mechanism side of the switchgear cannot be reduced and hence the efficiency of operation of the switchgear is not improved satisfactorily because the phase isolated type gas insulated switchgear has a height significantly greater than the three-phase common type switchgear (See FIG. 1 of the above-cited Japanese Patent document).

BRIEF SUMMARY OF THE INVENTION

In view of the above-identified circumstances, it is therefore an object of the present invention to provide a phase isolated type gas insulated switchgear that allows servicing/operating personnel to work without moving far away from the circuit breaker operating mechanism side so that the switchgear can be serviced/operated economically with ease.

There has been provided, in accordance with an aspect of the present invention, gas insulated switchgear comprising:

circuit breakers of three phases; circuit breaker vessels of the phases for containing the respective circuit breakers of the three phases separately, the vessels being installed horizontally substantially in parallel with each other, each of the vessels having first and second branching sections of the corresponding phase and being arranged separated from each other in the longitudinal direction of the circuit breaker, insulating gas being filled in the vessels and held in a hermetically sealed condition; first bus bars of the three phases, the first bus bar of each phase being connected to the first branching section of the circuit breaker vessel of the phase; first disconnector and maintenance earthning switches of the three phases, at least a first disconnector and maintenance earthning switch being provided for each phase, the first disconnector and maintenance earthning switch or switches of each phase being connected to the first bus bar of the phase and also to main bus bars of the phase extending in a direction different from the longitudinal direction of the circuit breaker of the phase; second bus bars of the three phases, the second bus bar of each phase being connected to the second branching section of the circuit breaker vessel of the phase; second disconnector and maintenance earthning switches of the three phases, the second disconnector and maintenance earthning switch of each phase being connected to the second bus bar of the phase, insulating gas being filled in the second disconnector and maintenance earthning switches in a hermetically sealed condition; circuit breaker operating mechanisms of the three phases arranged separately, the circuit breaker operating mechanism of each phase being connected substantially onto an extension feeder line of the longitudinal end located close to the first branching section of the circuit breaker vessel of the phase; first disconnector and maintenance earthning switch operating mechanisms of the three phases for operating the first disconnector and maintenance earthning switches of the three phases; second disconnector and maintenance earthning switch operating mechanisms of the three phases for operating the second disconnector and maintenance earthning switches of the three phases; first disconnector and maintenance earthning switch operation links of the three phases for connecting respectively the first disconnector and maintenance earthning switches and the first disconnector and maintenance earthning switch operating mechanisms of the three phases; and second disconnector and maintenance earthning switch operation links of the three phases for connecting respectively the second disconnector and maintenance earthning switches and the second disconnector and maintenance earthning switch operating mechanisms of the three phases, wherein the second disconnector and maintenance earthning switch operation links of the three phases being arranged so as to pass through inter-phases of the first bus bars, and operating panels of the circuit breaker operating mechanism, the first disconnector and maintenance earthning switch operating mechanism and the second disconnector and maintenance earthning switch operating mechanism of each phase being substantially arranged in a common flat plane.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Now, preferred embodiments of phase isolated type gas insulated switchgear according to the present invention will be described in greater detail by referring to the accompanying drawings. Throughout the drawings, the same or similar parts are denoted respectively by the same reference symbols and will not be described repeatedly.

First Embodiment

Figure 1:
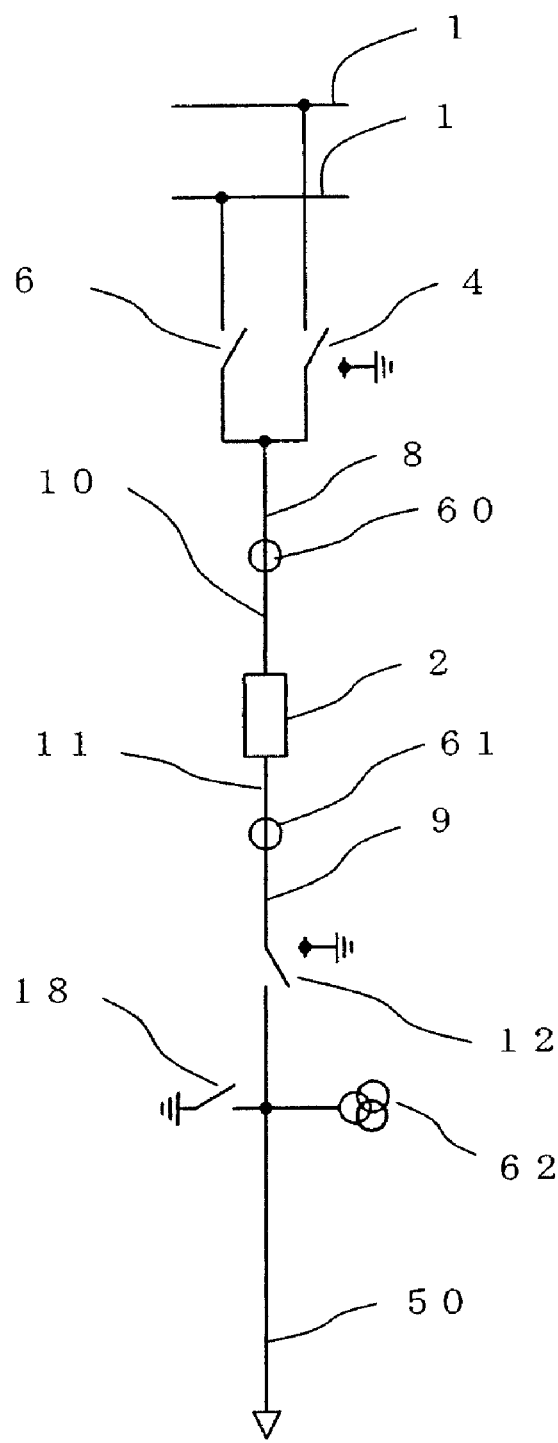
FIG. 1 is a schematic single line diagram of embodiments of gas insulated switchgear according to the present invention.

FIG. 1 is a schematic single line diagram of the first embodiment of gas insulated switchgear according to the present invention. Note that the single line diagram is applicable to all the other embodiments. As shown in FIG. 1, a disconnector and maintenance earthning switch (first disconnector and maintenance earthning switch) 4 for the main bus bars is connected to one of the two main bus bars 1, while a disconnector 6 for the main bus bars is connected to the other main bus bar 1. The disconnector and maintenance earthning switch 4 for the main bus bars and the disconnector 6 for the main bus bars are connected to a first bus bar 8 and then to an end of the circuit breaker 2 by way of first bus bar connecting section 10.

A second bus bar 9 is connected to the other end of the circuit breaker 2 by way of second bus bar connecting section 11, and a disconnector and maintenance earthning switch (second disconnector and maintenance earthning switch) 12 for the feeder line is connected to the second bus bar 9. The disconnector and maintenance earthning switch 12 for the feeder line is then connected to a feeder line 50 by way of a fast earthning switch 18 for the feeder line.

Note that reference symbols "60" and "61" in FIG. 1 denote current transformers and reference symbol "62" denotes a voltage transformer for measuring instrument.

Figure 2:
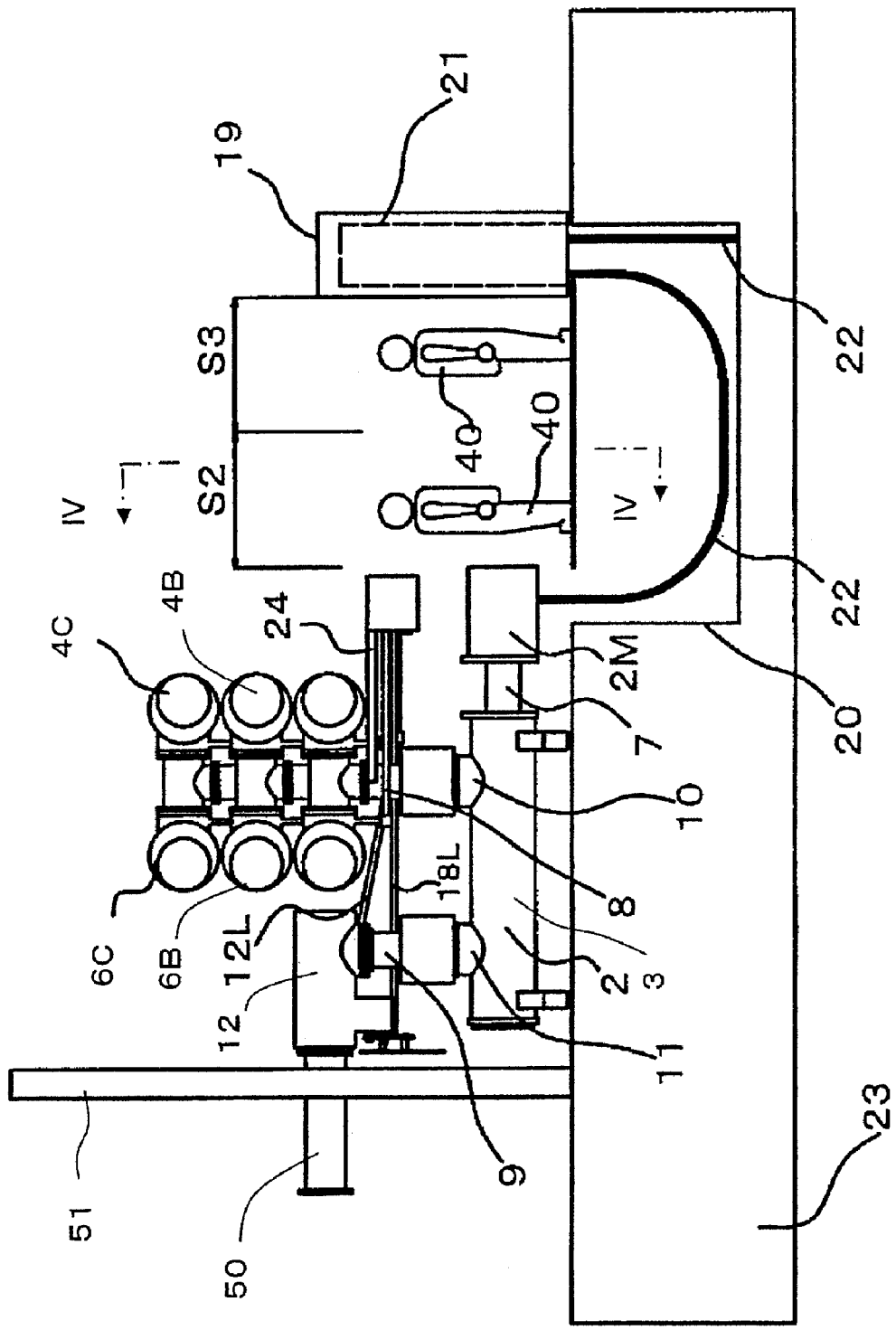
FIG. 2 is a cross-sectional elevation view of the first embodiment of gas insulated switchgear according to the present invention.
Figure 3:
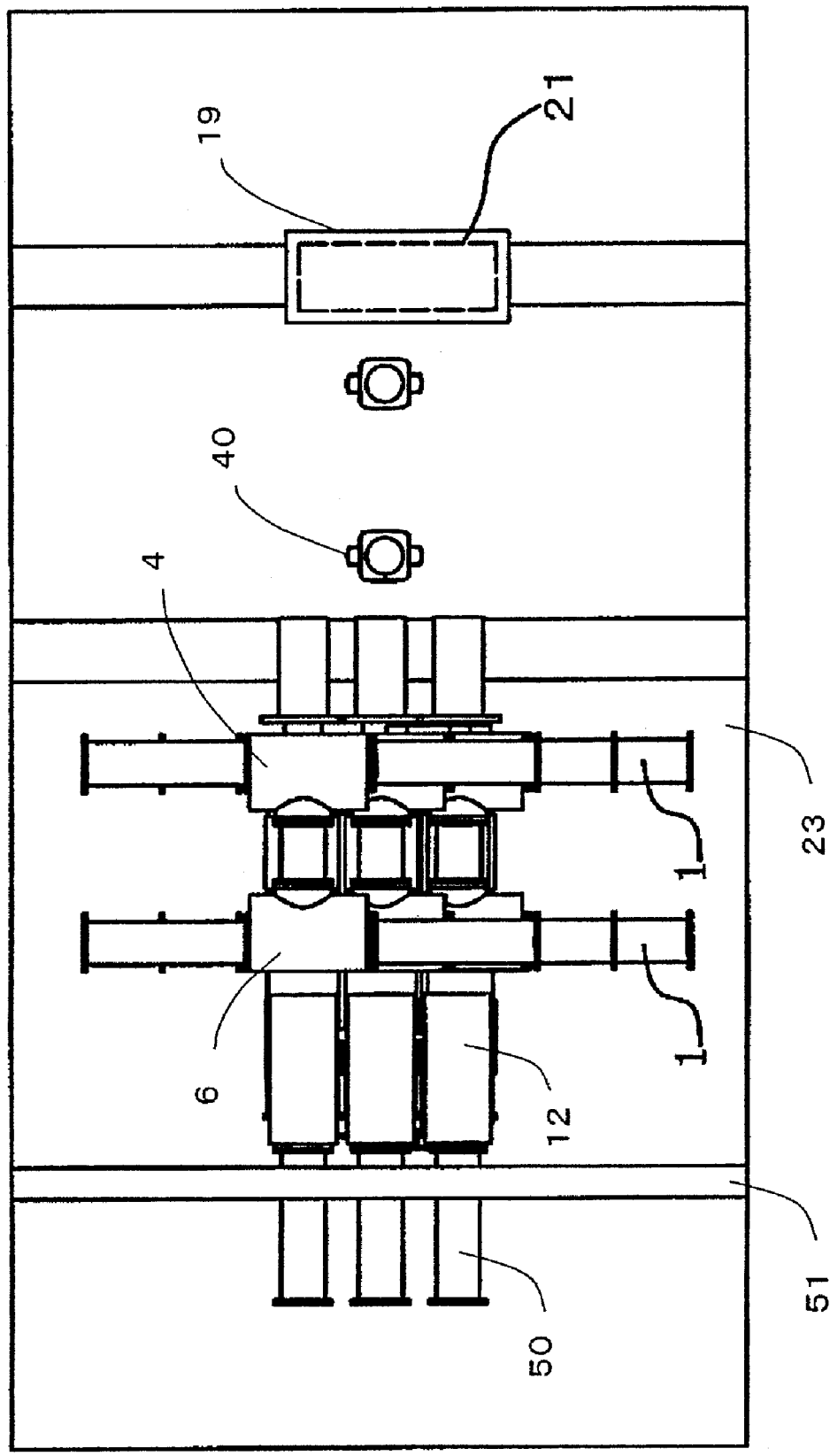
FIG. 3 is a plan view of the gas insulated switchgear of FIG. 2.
Figure 4:
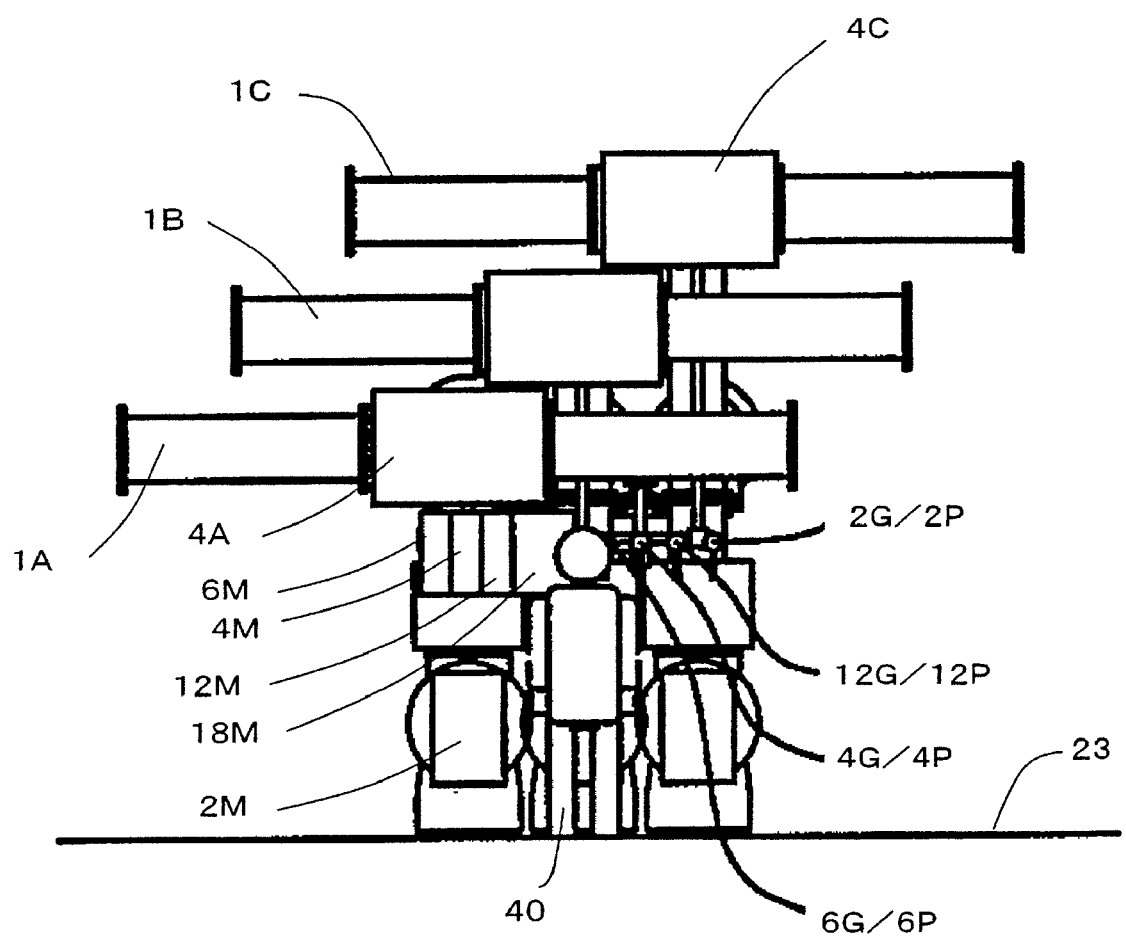
FIG. 4 is a cross-sectional lateral view of the gas insulated switchgear of FIG. 2 as viewed in the direction of the IV-IV arrow lines in FIG. 2.
Figure 5:
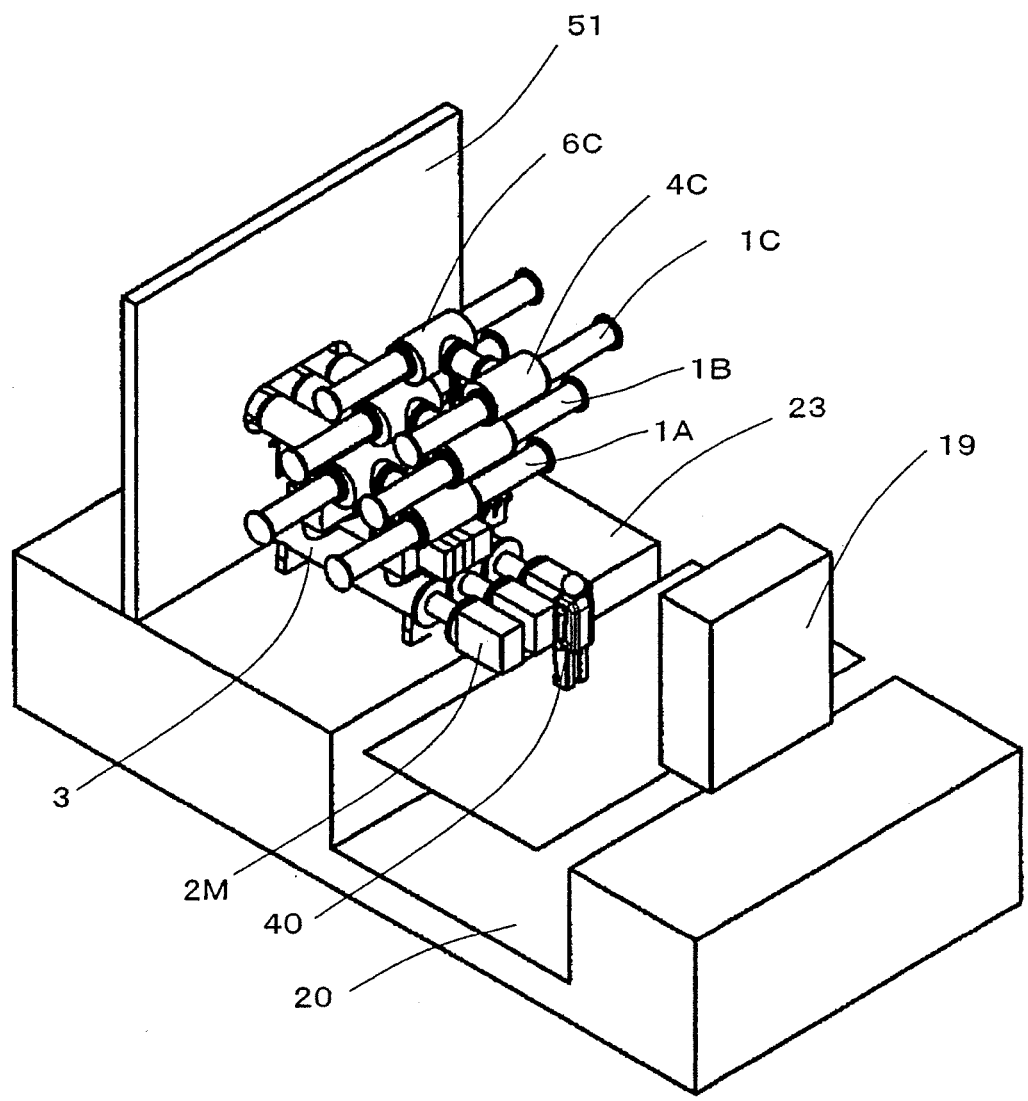
FIG. 5 is a perspective view of the gas insulated switchgear of FIG. 2.

Now, the specific three-dimensional structure of the first embodiment of gas insulated switchgear of the present invention will be described by referring to FIGS. 2 through 5. FIG. 2 is a cross-sectional elevation view of the first embodiment of gas insulated switchgear according to the present invention. FIG. 3 is a plan view of the gas insulated switchgear of FIG. 2. FIG. 4 is a cross-sectional lateral view of the gas insulated switchgear of FIG. 2 as viewed in the direction of the IV-IV arrow lines in FIG. 2. FIG. 5 is a perspective view of the gas insulated switchgear of FIG. 2. Since the embodiment is of the phase isolated type, the same components are denoted respectively by the same reference symbols and the phases are discriminated from each other by suffixes A, B and C. Note, however, the suffixes may be omitted when apparently no misunderstanding occurs by doing so.

Referring now to FIGS. 2 through 5, a circuit breaker 2 is contained in a circuit breaker vessel 3 of each phase and arranged in parallel with each other on a common horizontal base 23. A first branching section and a second branching section are arranged in an upper part of each of the circuit breaker vessels 3 and separated from each other in the longitudinal direction. Thus, the first bus bar connecting section 10 and the second bus bar connecting section 11 are formed there. The disconnector and maintenance earthning switches 4A, 4B, 4C for the main bus bars of the three phases are arranged vertically above the disconnector vessel 3. Similarly, the disconnectors 6A, 6B, 6C of the three phases are arranged vertically above the disconnector vessel 3. The disconnector and maintenance earthning switch 4 for the main bus bars of each phase and the corresponding disconnector 6 for the main bus bars are arranged on the same horizontal plane. The main bus bars 1 of each phase extend horizontally, and perpendicularly relative to the longitudinal direction of the circuit breaker 2.

A circuit breaker operating mechanism 2M is connected to the end of each circuit breaker vessel 3 located close to the first bus bar connecting section 10 by way of a circuit breaker linking/connecting section 7. The circuit breaker operating mechanism 2M contains a power source for driving the internal electrodes of the circuit breaker 2 and the control circuit thereof (not shown). The circuit breaker linking/connecting section 7 can be mechanically removably fitted in position and shows a diameter smaller than the circuit breaker vessel 3 and the circuit breaker operating mechanism 2M.

The disconnector and maintenance earthning switch 12 for the feeder line and also the fast earthning switch 18 for the feeder line are arranged above the second bus bar connecting section 11. The feeder line 50 connected to the fast earthning switch 18 for the feeder line extends horizontally to the circuit breaker 2 through the lateral wall 51 of the substation or the switchgear station.

As viewed from the circuit breaker operating mechanism 2M, the disconnector and maintenance earthning switch 4 for the main bus bars is arranged close to it and the disconnector 6 for the main bus bars is arranged immediately behind the disconnector and maintenance earthning switch 4 for the main bus bars. Then, the disconnector and maintenance earthning switch 12 for the feeder line and the fast earthning switch 18 for the feeder line are arranged behind the disconnector 6 for the main bus bars.

A disconnector and maintenance earthning switch operating mechanism 4M for operating the disconnector and maintenance earthning switch 4 for the main bus bars is connected to the latter by way of a disconnector and maintenance earthning switch operation link 4L. Similarly, a disconnector operating mechanism 6M for operating the disconnector 6 for the main bus bars is connected to the latter by way of a disconnector operation link 6L. A disconnector and maintenance earthning switch operating mechanism 12M for operating the disconnector and maintenance earthning switch 12 for the feeder line is connected to the latter by way of a disconnector and maintenance earthning switch operation link 12L. Similarly, a fast earthning switch operating mechanism 18M for operating the fast earthning switch 18 for the feeder line is connected to the latter by way of a fast earthning switch operation link 18L.

Additionally, gas gauges 2G, 4G, 6G, 12G for respectively gauging the pressures or the densities of the insulation medium gases in the inside of the circuit breaker 2, the disconnector and maintenance earthning switch 4 for the main bus bars, the disconnector 6 for the main bus bars and the disconnector and maintenance earthning switch 12 for the feeder line are connected by piping. The insulation medium gases are filled in the inside of the gas insulated switchgear for the purpose of insulation of the latter, and their insulation performances are dependent on the pressures or the densities of the corresponding respective gaseous insulation mediums. They can be monitored for their insulation performances by the gas gauges 2G, 4G, 6G, 12G respectively.

Note that the gas gauge 12G can be used also for gauging the insulating gas in the inside of the fast earthning switch 18 for the feeder line because the fast earthning switch 18 for the feeder line and the disconnector and maintenance earthning switch 12 for the feeder line are contained in the same gas compartment.

In this embodiment, the disconnector and maintenance earthning switch operating mechanism 4M is arranged immediately below the corresponding disconnector and maintenance earthning switch 4 for the main bus bars and above the circuit breaker operating mechanism 2M. The disconnector operation link 6L passes outside a first bus bar 8A and is arranged at a position that does not interfere with adjacent feeder lines and connected to the disconnector operating mechanism 6M. On the other hand, the disconnector and maintenance earthning switch operation link 12L and the fast earthning switch operation link 18M are made to pass through the inter-phase space of the first bus bars 8A and 8B and second bus bars 9A and 9B.

With the above-described arrangement, it is possible to arrange the disconnector and maintenance earthning switch operating mechanism 4M, the disconnector operating mechanism 6M, the disconnector and maintenance earthning switch operating mechanism 12M and the fast earthning switch operating mechanism 18M in parallel in a horizontal direction above the circuit breaker operating mechanism 2M. Note that all the operating mechanisms 4M, 6M, 12M, 18M are supported by a support 24 from the first bus bar 8.

The gas gauges 6G, 12G are also arranged above the circuit breaker operating mechanism 2M. The pipeworks 6P, 12P respectively connecting between the disconnector 6 for the main bus bars and the gas gauge 6G and between the disconnector and maintenance earthning switch 12 for the feeder line and the gas gauge 12G also pass through the inter-phase space of the first bus bars 8A and 8B and the second bus bars 9A and 9B.

In this way, the operating mechanisms 4M, 6M, 12M, 18M and the gas gauges 2G, 4G, 6G, 12G are all arranged horizontally on the same plane within a small range above the circuit breaker operating mechanism 2M in this embodiment.

In this embodiment, an local control panel 19 having a terminal table 21 is arranged at a position located vis-à-vis the operating mechanisms 4M, 6M, 12M, 18M and the gas gauges 2G, 4G, 6G, 12G. A gap (S2+S3) that is large enough for a standing operator 40 to operate is provided between the operating mechanisms 4M, 6M, 12M, 18M and the gas gauges 2G, 4G, 6G, 12G, and the local control panel 19.

A duct 20 is arranged under the floor where the operator 40 is standing and a low voltage control cable 22 extends into the duct 20 through the inter-phase space of the circuit breaker linking/connecting section 7 having a width smaller than the circuit breaker vessel 3. With this arrangement, the operating mechanisms 4M, 6M, 12M, 18M and the gas gauges 2G, 4G, 6G, 12G and the local control panel 19 are linked with each other. Additionally, the local control panel 19 is linked to a host system (not shown) by way of the low voltage control cable 22.

With this embodiment, it is possible to arrange the operating mechanisms 4M, 6M, 12M, 18M of all the disconnector and maintenance earthning switches of the feeder line and so on and the gas gauges 2G, 4G, 6G, 12G of the feeder line in front of the feeder line horizontally and in parallel with each other in the direction of the main bus bars 1. With this arrangement, it is possible for an operator to monitor and operate for the mechanisms and the gauges to a remarkable improvement of efficiency of operation. Additionally, as the disconnector linking/connecting section 7 is arranged between the circuit breaker 2 and the operating mechanism 2M, it is possible to provide a sufficient space for wiring between the circuit breaker vessel 3 and the operating mechanism 2M.

Additionally, it is possible to remove the circuit breaker operating mechanism 2M without affecting the low voltage control cable 22 by separating the circuit breaker linking/connecting section 7. Since the circuit breaker 2 is connected with the first bus bar 8 and the second bus bar 9 respectively at the first bus bar connecting section 10 and the second bus bar connecting section 11, it is possible to remove the circuit breaker 2 including the circuit breaker vessel 3 by separating the bus bar connecting sections 10, 11 after removing the circuit breaker operating mechanism 2M.

Still additionally, since the operating mechanisms 4M, 6M, 12M, 18M of all the disconnector and maintenance earthning switches of the feeder line and so on are supported by a support 24 from the first bus bar 8, it is possible to individually remove the operating mechanisms 4M, 6M, 12M, 18M including those of the disconnector and maintenance earthning switches by removing the corresponding links 4L, 6L, 12L, 18L of the disconnector and maintenance earthning switches.

Second Embodiment

Figure 6:
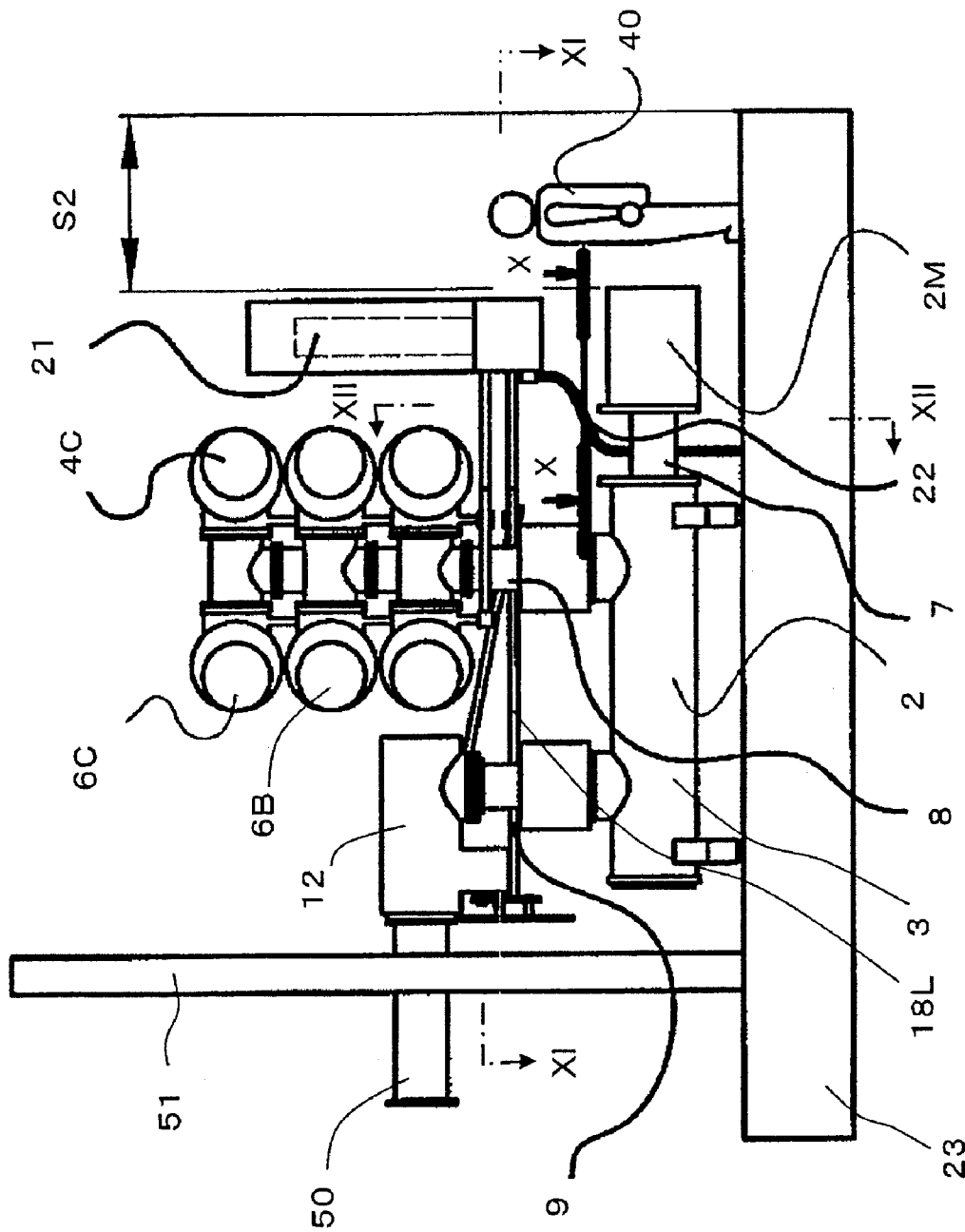
FIG. 6 is a cross-sectional elevation view of the second embodiment of gas insulated switchgear according to the present invention.
Figure 7:
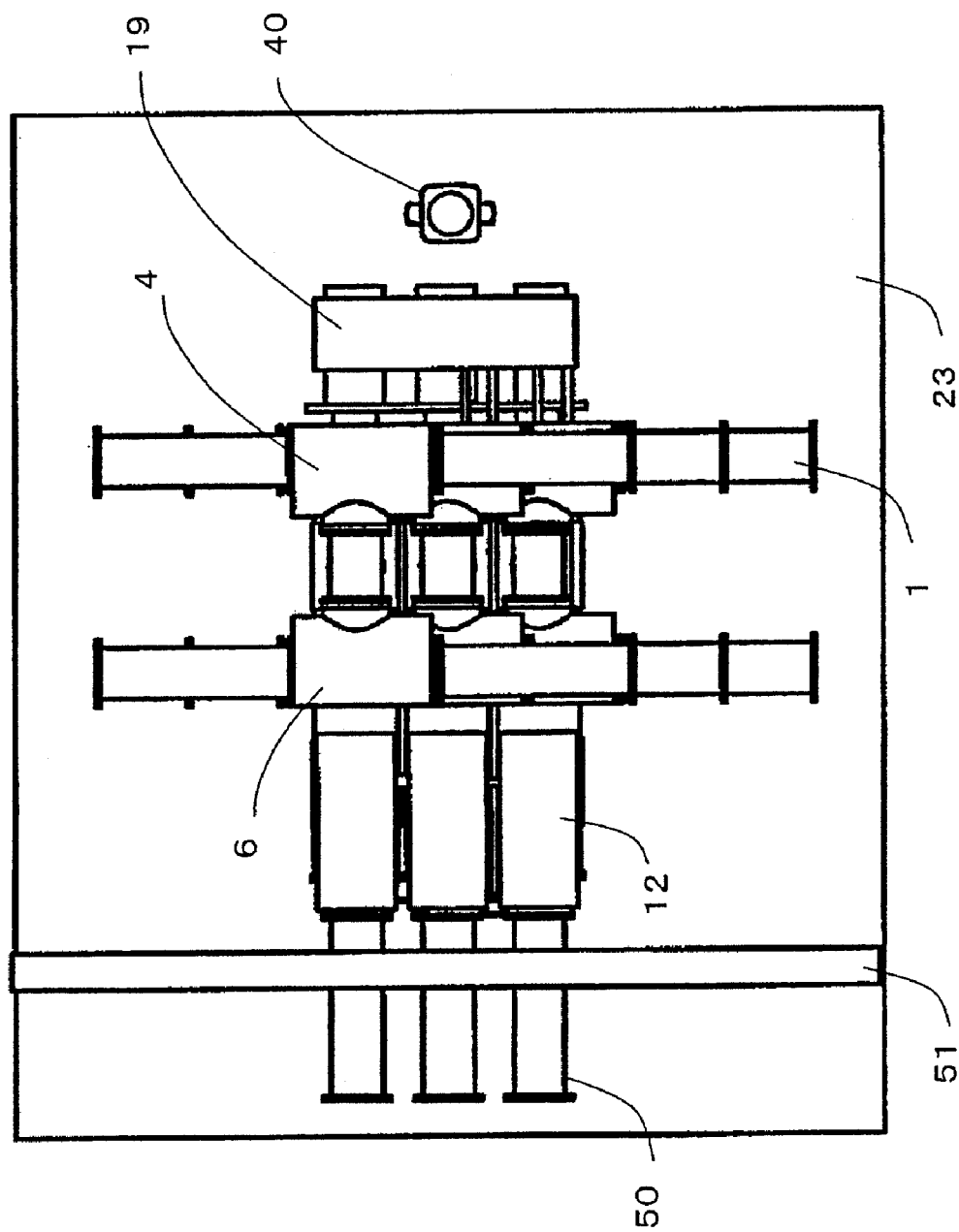
FIG. 7 is a plan view of the gas insulated switchgear of FIG. 6.
Figure 8:
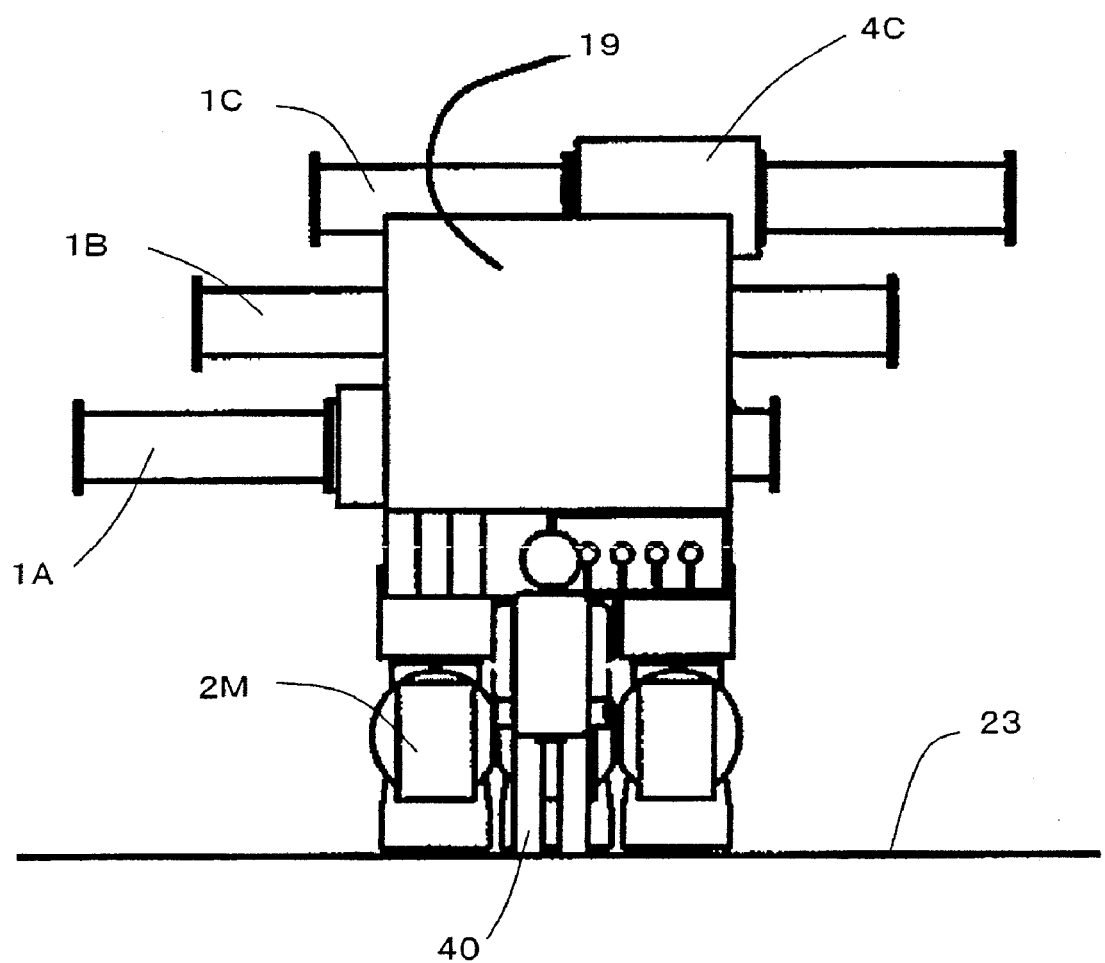
FIG. 8 is a lateral view of the gas insulated switchgear of FIG. 6.
Figure 9:
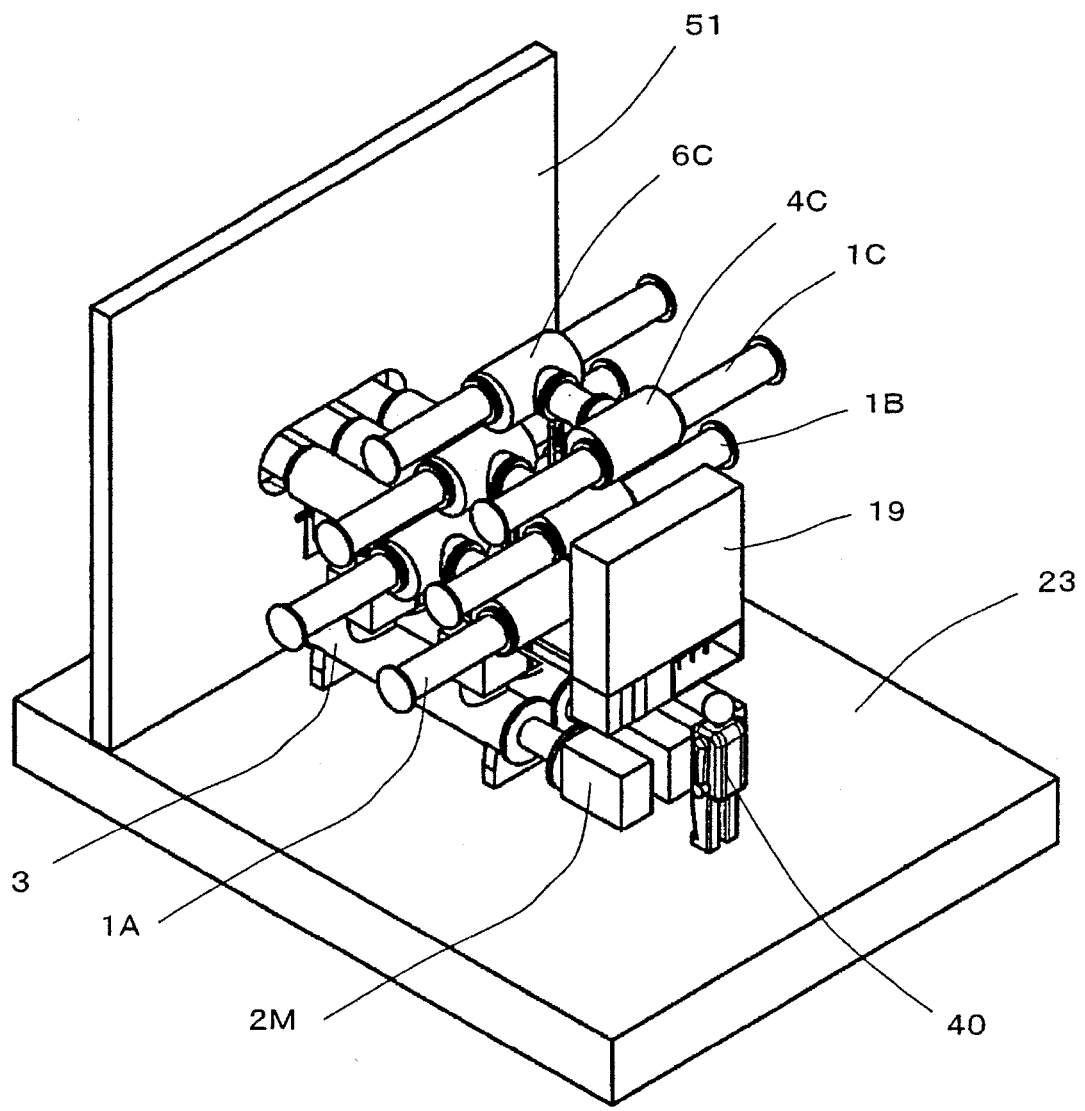
FIG. 9 is a perspective view of the gas insulated switchgear of FIG. 6.
Figure 10:
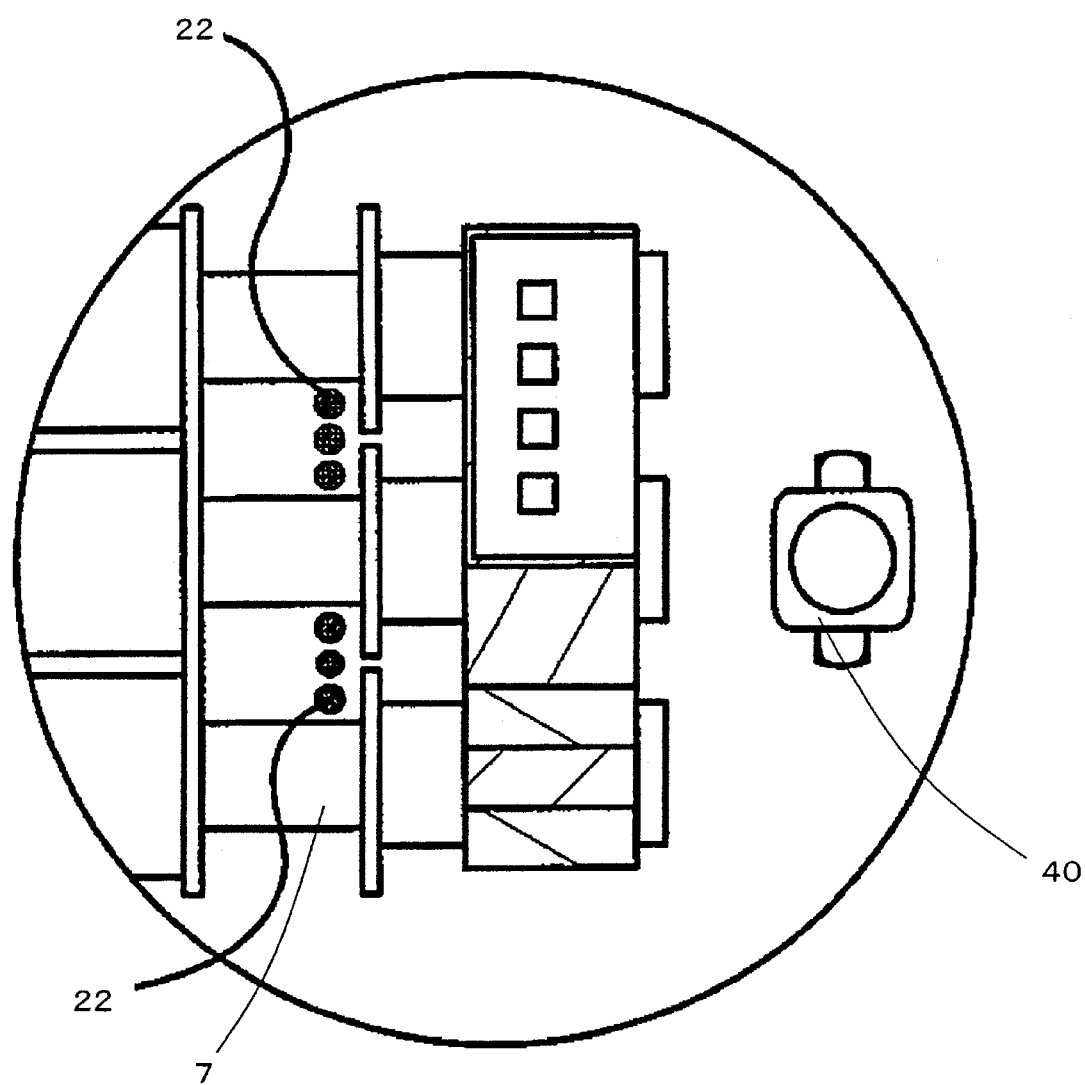
FIG. 10 is a cross-sectional partial view of the gas insulated switchgear of FIG. 6 as viewed in the direction of the X-X arrow lines in FIG. 6.
Figure 11:
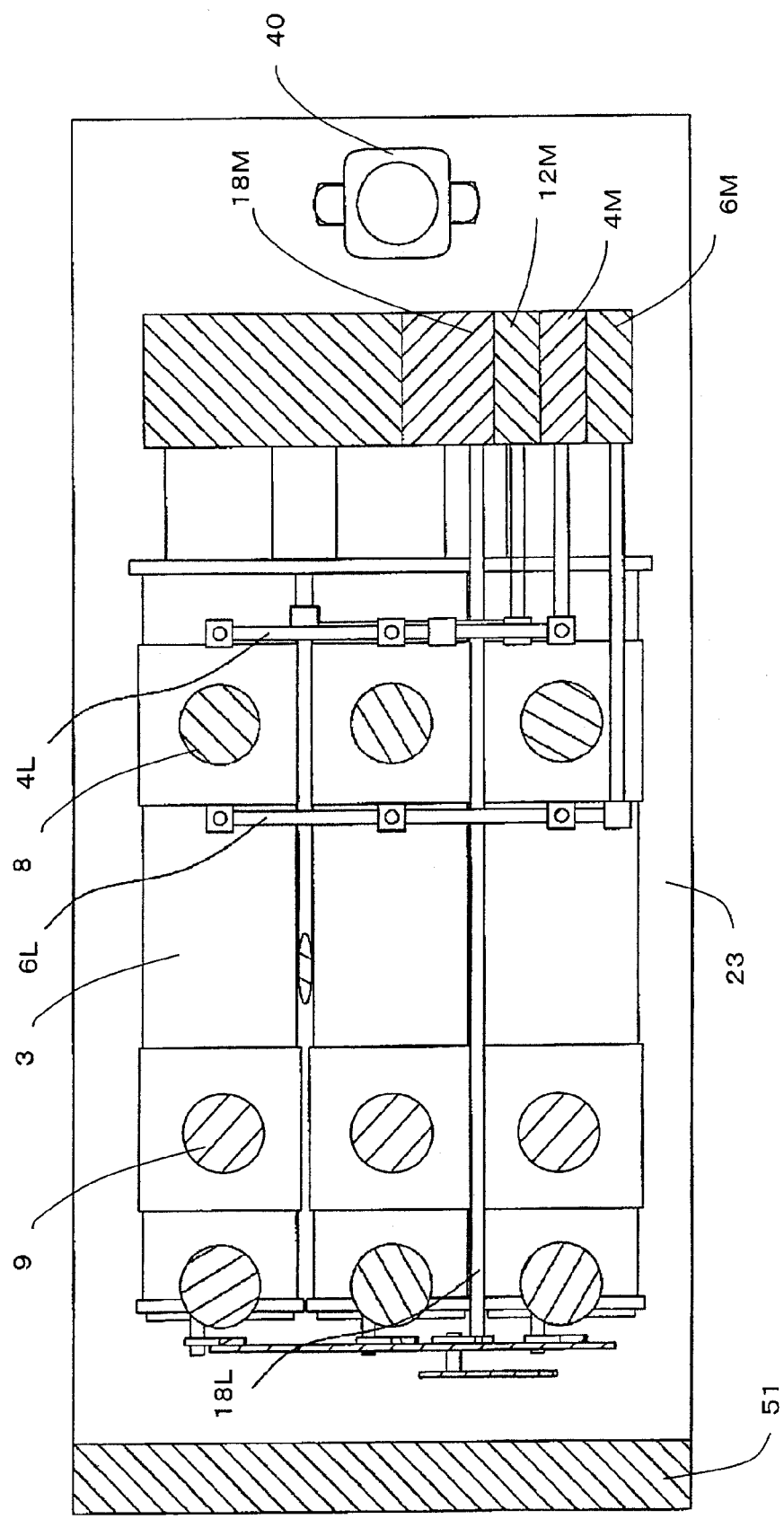
FIG. 11 is a cross-sectional plan view of the gas insulated switchgear of FIG. 6 as viewed in the direction of the XI-XI arrow lines in FIG. 6.
Figure 12:
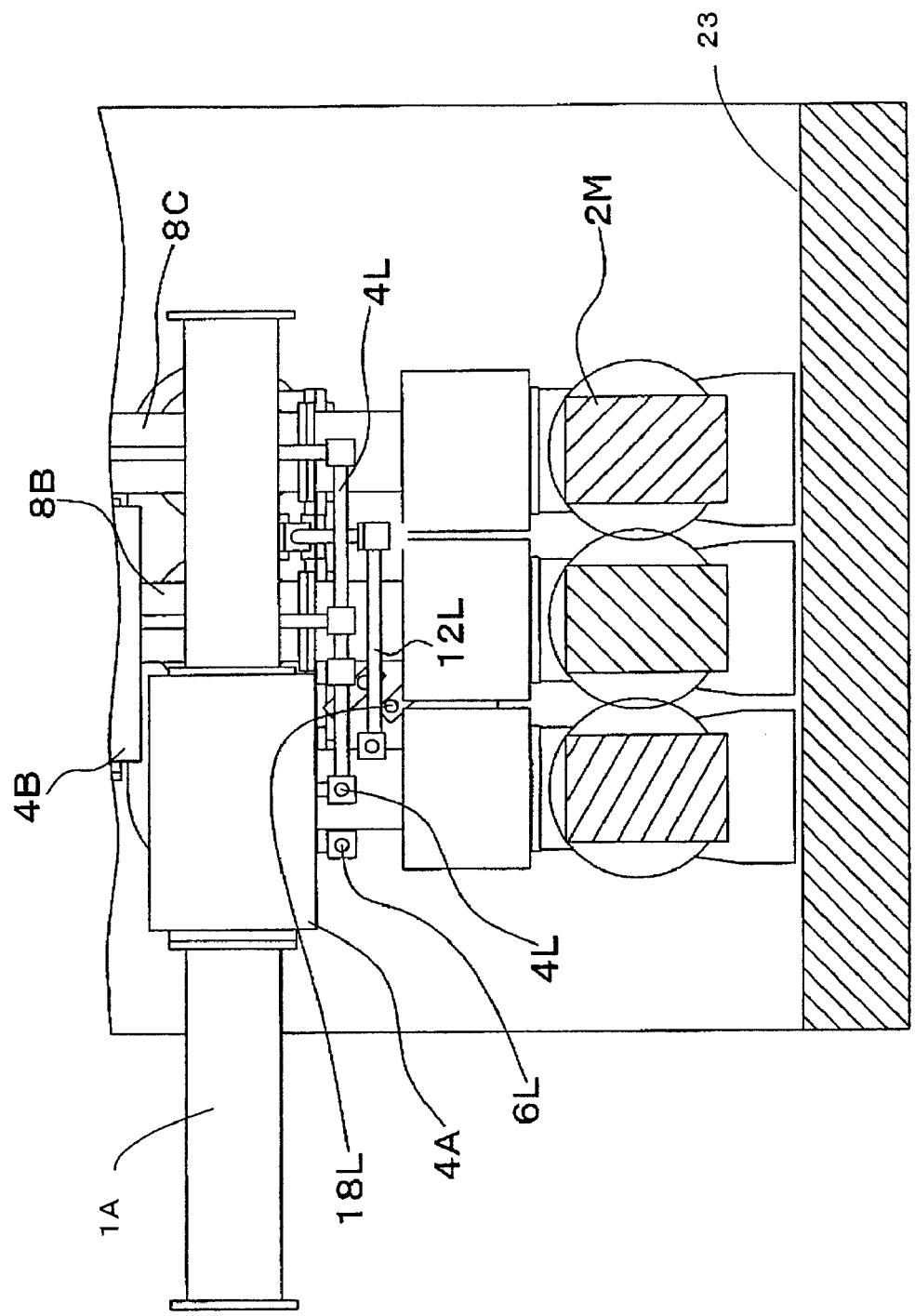
FIG. 12 is a cross-sectional elevation view of the gas insulated switchgear of FIG. 6 as viewed in the direction of the XII-XII arrow lines in FIG. 6.
Figure 13:
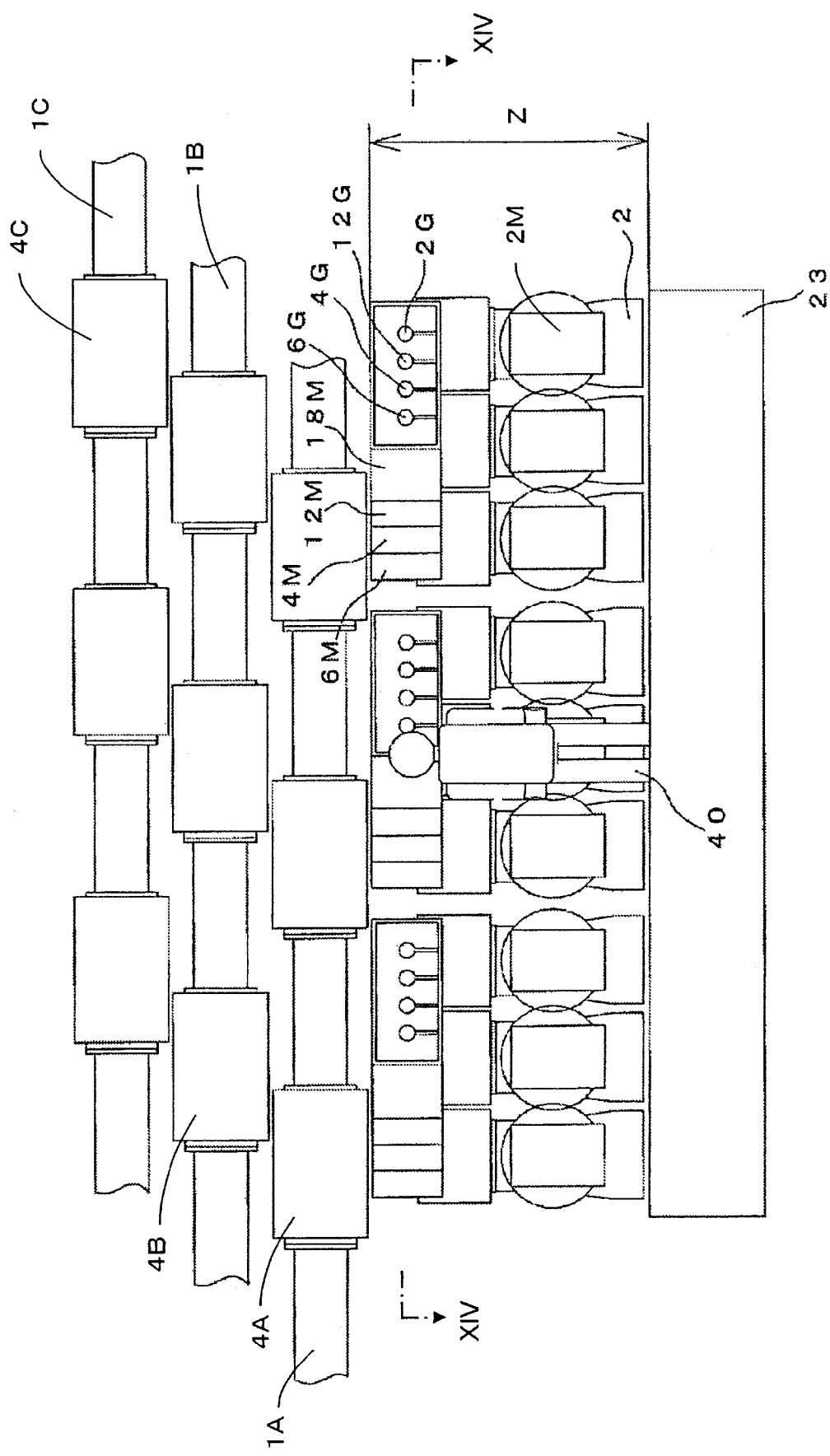
FIG. 13 is a partial lateral view of gas insulated switchgears of FIG. 8 arranged transversally for a plurality of feeder lines.
Figure 14:
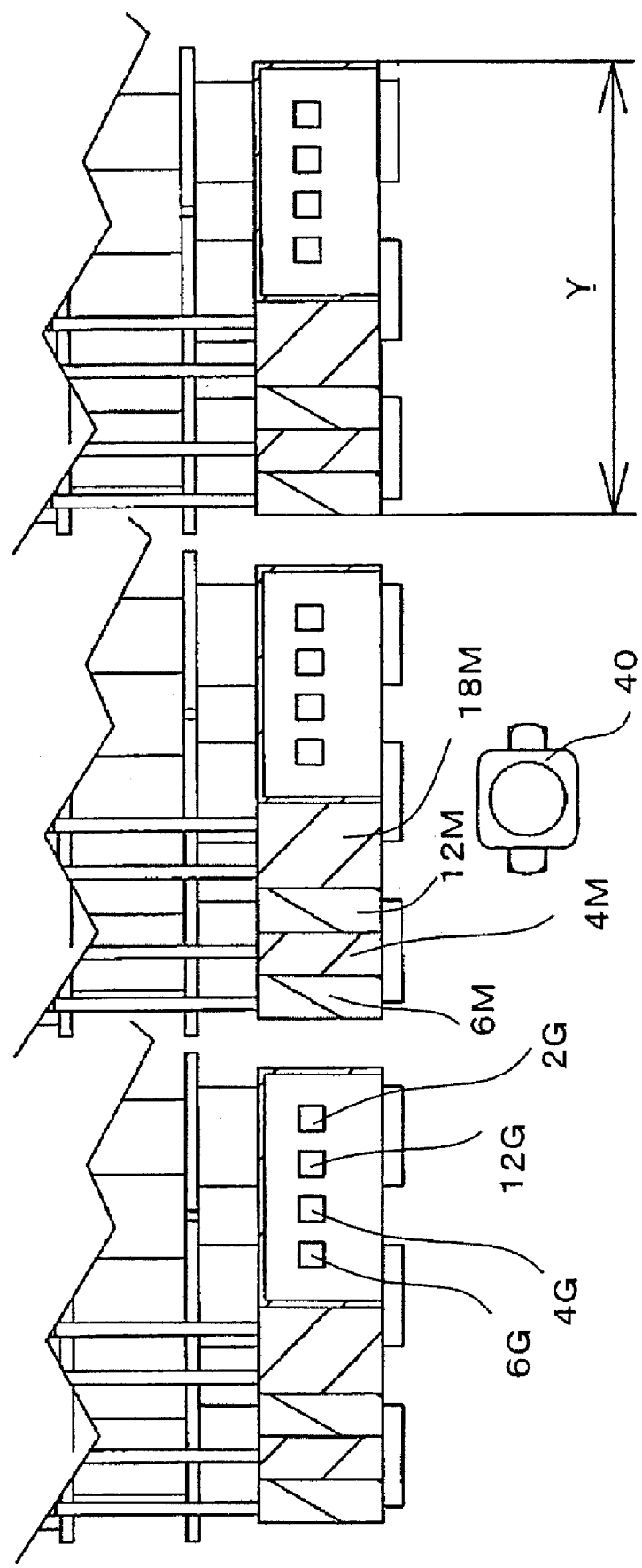
FIG. 14 is a cross-sectional plan view of the gas insulated switchgears of FIG. 13 as viewed in the direction of the XIV-XIV arrow lines in FIG. 13.

Now, the second embodiment of gas insulated switchgear according to the present invention will be described below by referring to FIGS. 6 through 14. FIG. 6 is a cross-sectional elevation view of the second embodiment of gas insulated switchgear according to the present invention. FIG. 7 is a plan view of the gas insulated switchgear of FIG. 6. FIG. 8 is a lateral view of the gas insulated switchgear of FIG. 6. FIG. 9 is a perspective view of the gas insulated switchgear of FIG. 6. FIG. 10 is a cross-sectional partial view of the gas insulated switchgear of FIG. 6 as viewed in the direction of the X-X arrow lines in FIG. 6. FIG. 11 is a cross-sectional plan view of the gas insulated switchgear of FIG. 6 as viewed in the direction of the XI-XI arrow lines in FIG. 6. FIG. 12 is a cross-sectional elevation view of the gas insulated switchgear of FIG. 6 as viewed in the direction of the XII-XII arrow lines in FIG. 6. FIG. 13 is a partial lateral view of gas insulated switchgears of FIG. 8 arranged transversally for a plurality of feeder lines (for three feeder lines). FIG. 14 is a cross-sectional plan view of the gas insulated switchgears of FIG. 13 as viewed in the direction of the XIV-XIV arrow lines in FIG. 13.

In this embodiment, the local control panel 19 is arranged above the circuit breaker operating mechanism 2M and the operating mechanisms 4M, 6M, 12M, 18M such as those the disconnector and maintenance earthning switches and the gas gauges 2G, 4G, 6G, 12G of the feeder line are arranged horizontally in the local control panel 19 for controlling and monitoring the feeder line.

Additionally, the operating mechanisms 4M, 6M, 12M, 18M such as those the disconnector and maintenance earthning switches and the instrument surfaces of the gas gauges 2G, 4G, 6G, 12G of the feeder line are aligned substantially in a common flat plane with the circuit breaker operating mechanism 2M.

Preferably, for each of the feeder lines illustrated in FIGS. 13 and 14, the sum Y of the width of operating mechanisms 4M, 6M, 12M, 18M and that of the operation panel surfaces of the gas gauges is not greater 180 cm and the height Z of the operation panel surfaces of the operating mechanisms 4M, 6M, 12M, 18M and the instrument surfaces of the gas gauges 2G, 4G, 6G, 12G is not greater than 170 cm. Preferably, the difference between the height of the operation panel surfaces of the operating mechanisms 4M, 6M, 12M, 18M and the gas gauges 2G, 4G, 6G, 12G and the height of the circuit breaker operating mechanism 2M is not more than 70 cm. With such dimensional limitations, it is possible for the operator to check the operation and the number of times of actuation of the feeder line and the gauges without moving even by a step to consequently improve the efficiency of inspection.

In this embodiment, the low voltage control cable 22 for electrically connecting the operating mechanisms 4M, 6M, 12M, 18M of all the disconnector and maintenance earthning switches of the feeder line, the gas gauges 2G, 4G, 6G, 12G of the feeder line and the local control panel 19 for controlling/monitoring the feeder line is no longer required. Additionally, the terminal table 21 for connecting the low voltage control cable 22 that is conventionally contained in each of the operating mechanisms 4M, 6M, 12M, 18M of all the disconnector and maintenance earthning switches of the feeder line, the gas gauges 2G, 4G, 6G, 12G of the feeder line and the local control panel 19 is no longer required. Furthermore, the duct 20, the trays, the wire tubes and other incidental equipment for supporting and protecting the low voltage control cable 22 between the operating mechanisms 4M, 6M, 12M, 18M of all the disconnector and maintenance earthning switches of the feeder line and the gas gauges 2G, 4G, 6G, 12G of the feeder line and the local control panel 19 are no longer required. Finally, the space S3 for installing and operating the local control panel (see FIG. 2) is no longer necessary.

Conventionally, the operation of connecting the operating mechanisms 4M, 6M, 12M, 18M of all the disconnector and maintenance earthning switches of the feeder line and the gas gauges 2G, 4G, 6G, 12G of the feeder line and the local control panel 19 can be conducted only on the final installation spots because the local control panel 19 is separated from the gas insulated switchgear. To the contrary, in this embodiment, the operating mechanisms 4M, 6M, 12M, 18M of all the disconnector and maintenance earthning switches of the feeder line and the gas gauges 2G, 4G, 6G, 12G of the feeder line and the local control panel 19 are connected in the inside of the local control panel 19 so that the connecting operator can be conducted in the plant of manufacturing the gas insulated switchgear. Thus, this embodiment provides an advantage of improving the reliability of the connections and reducing the time required for the local work to consequently improve the overall economy.

Third Embodiment

Figure 15:
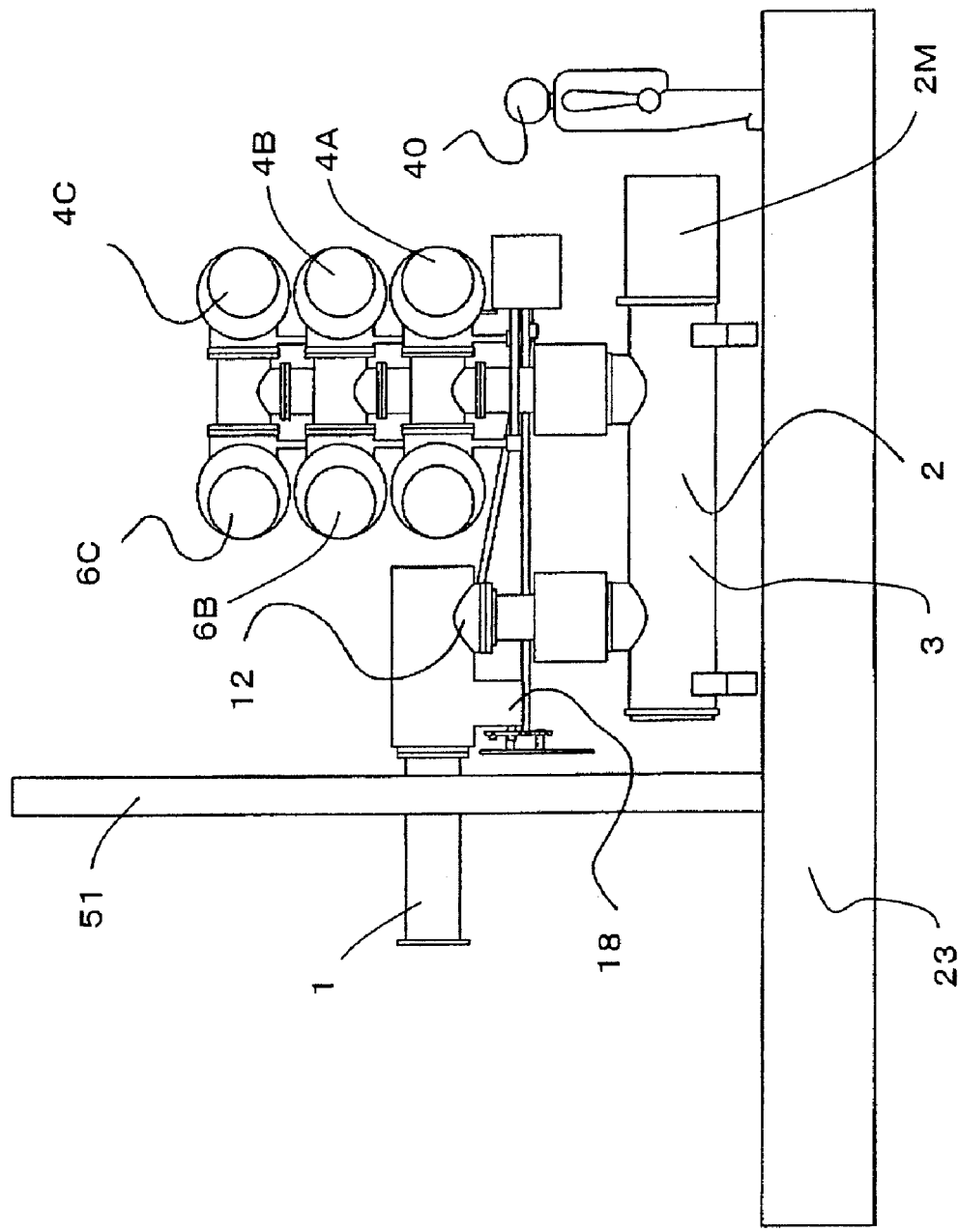
FIG. 15 is a cross-sectional elevation view of the third embodiment of gas insulated switchgear according to the present invention.
Figure 16:
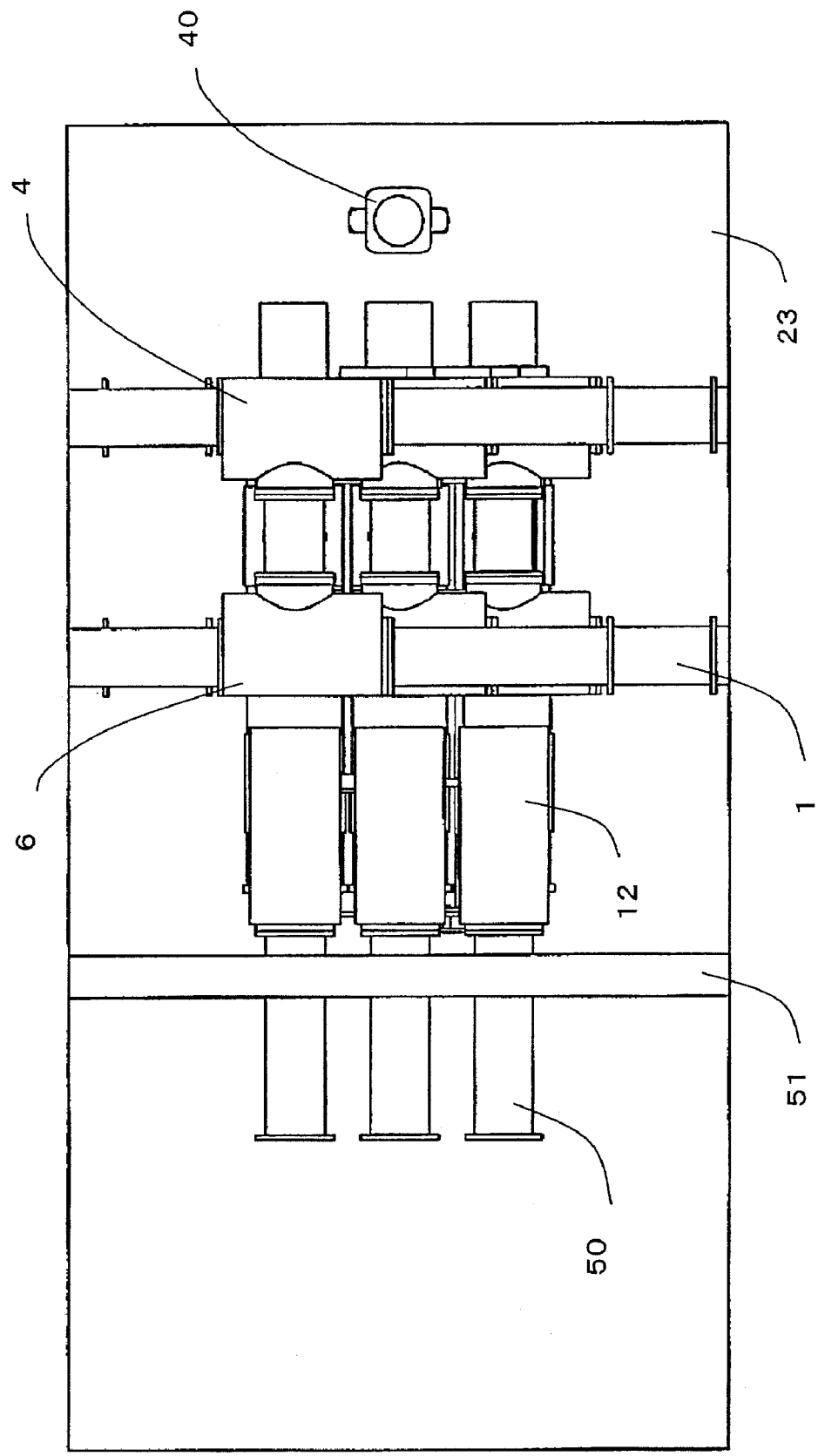
FIG. 16 is a plan view of the gas insulated switchgear of FIG. 15.
Figure 17:
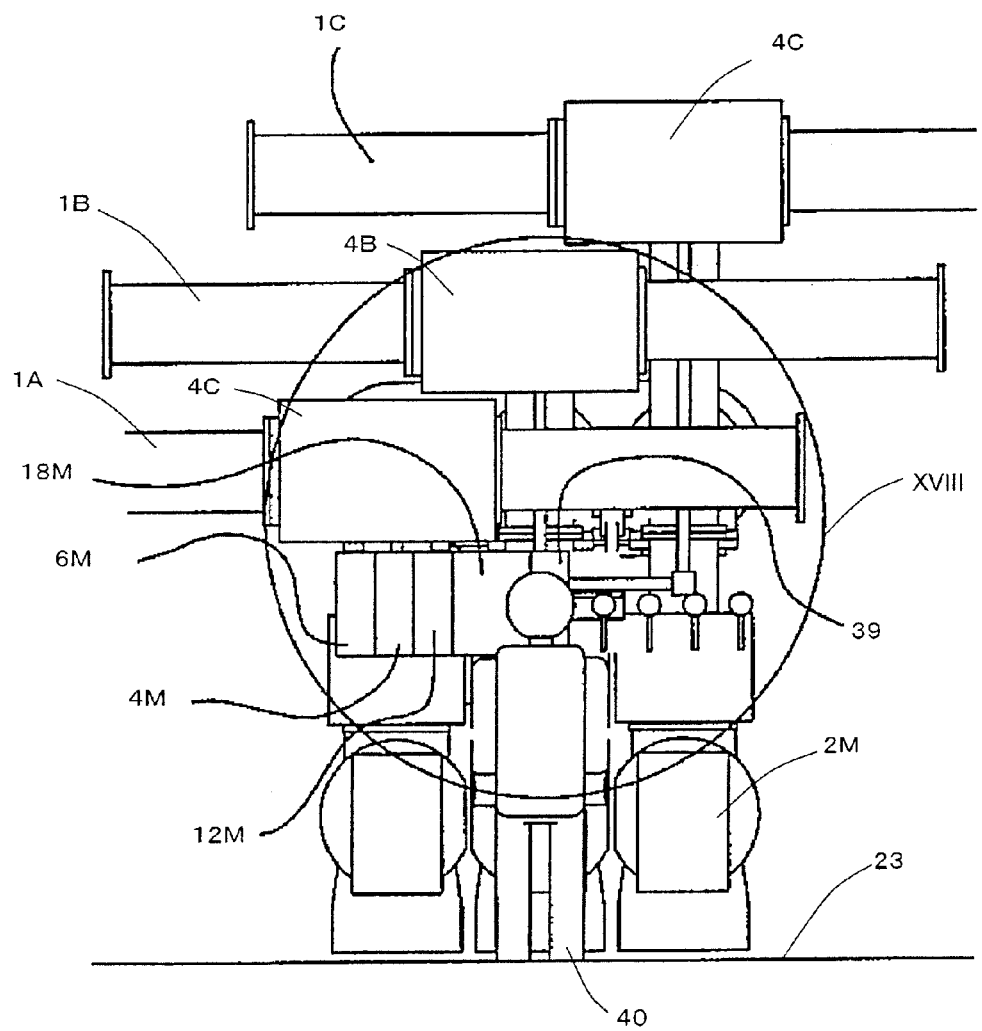
FIG. 17 is a lateral view of the gas insulated switchgear of FIG. 15.
Figure 18:
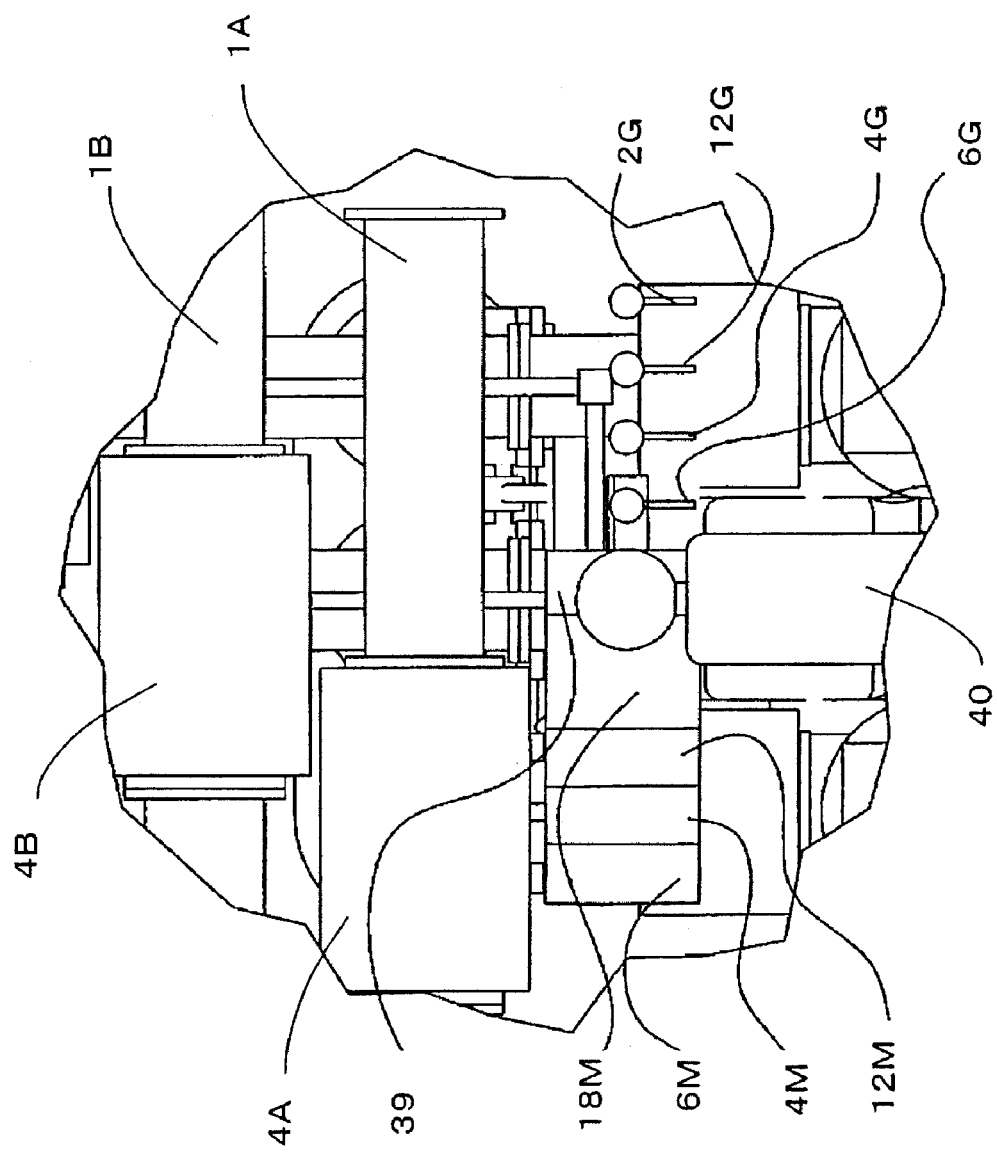
FIG. 18 is an enlarged partial lateral view of the part indicated by XVIII in FIG. 17.
Figure 19:
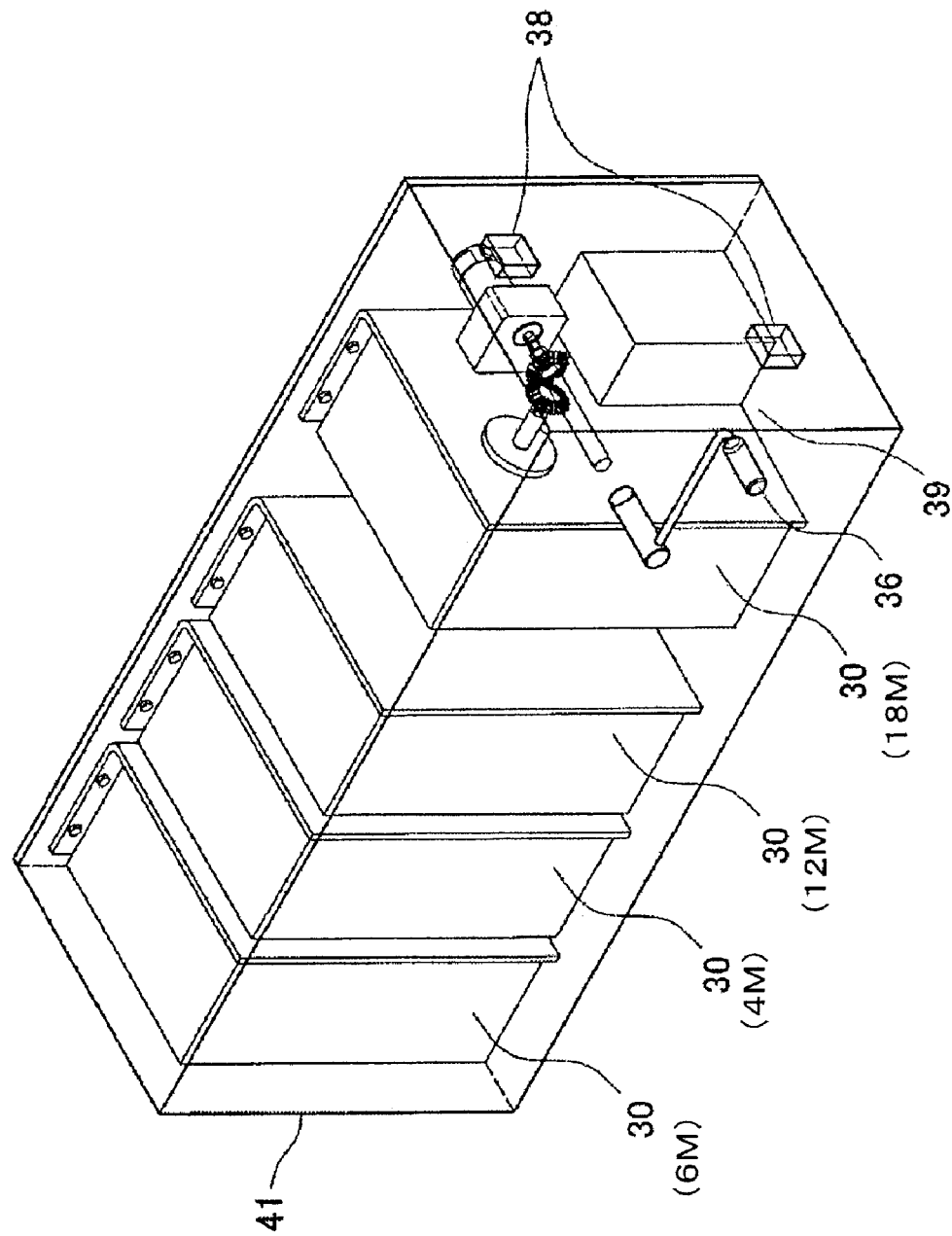
FIG. 19 is a schematic perspective view of the operating mechanisms of the third embodiment of gas insulated switchgear, showing the positional arrangement thereof.
Figure 20:
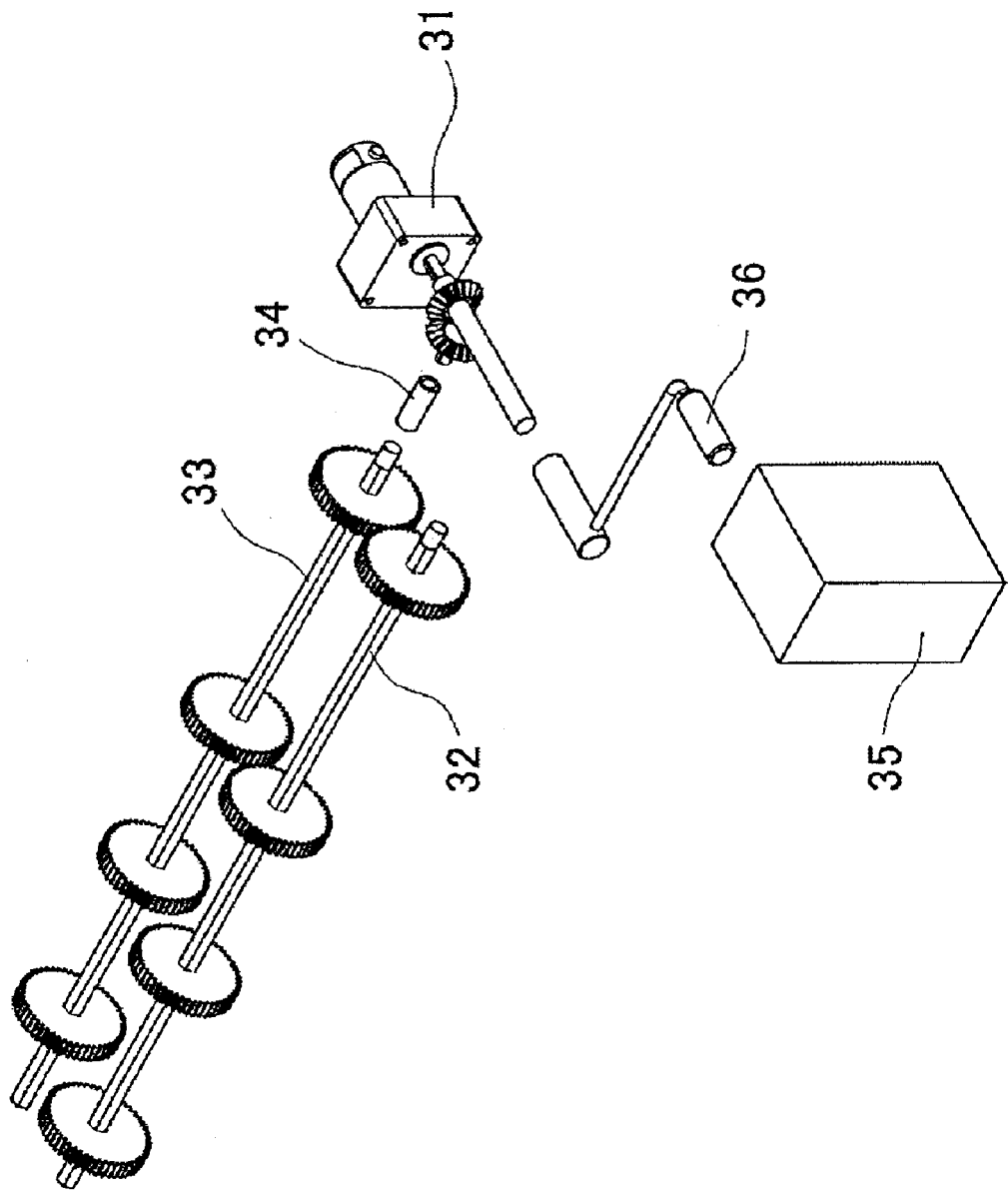
FIG. 20 is a schematic exploded perspective view of an operating mechanism that can be used for the third embodiment of gas insulated switchgear according to the present invention.

Now, the third embodiment of gas insulated switchgear according to the present invention will be described below by referring to FIGS. 15 through 20. FIG. 15 is a cross-sectional elevation view of the third embodiment of gas insulated switchgear according to the present invention. FIG. 16 is a plan view of the gas insulated switchgear of FIG. 15. FIG. 17 is a lateral view of the gas insulated switchgear of FIG. 15. FIG. 18 is an enlarged partial lateral view of the part indicated by XVIII in FIG. 17. FIG. 19 is a schematic perspective view of the operating mechanisms of the third embodiment of gas insulated switchgear, showing the positional arrangement thereof. FIG. 20 is a schematic exploded perspective view of an operating mechanism that can be used for the third embodiment of gas insulated switchgear according to the present invention.

In this embodiment, the operating mechanisms 4M, 6M, 12M, 18M of all the disconnector and maintenance earthning switches of the feeder line and the gas gauges 2G, 4G, 6G, 12G of the feeder line are arranged in the inside of the local control panel for controlling/monitoring the feeder line.

Additionally, as shown in FIGS. 19 and 20, only a single drive section 39 is arranged in the inside of the local control panel as a common drive section for driving all the disconnector and maintenance earthning switches of the feeder line and other components. The output of the drive section 39 can be switched to any of the individual disconnector and maintenance earthning switches by axially moving a transmission shaft 32 or a drive shaft 33. Still additionally, a switching selection circuit 35 is provided as a circuit for axially moving the transmission shaft 32. The operating mechanisms 4M, 6M, 12M, 18M of all the disconnector and maintenance earthning switches and so on are contained in a common cabinet 41 as individually removable operating modules 30 that share a ventilation filter 38 and other common devices. The operating modules 30 can be individually replaced by new ones.

Now, the switching selection mechanism will be described by way of an example of configuration thereof by referring to FIG. 20. The switching selection circuit 35 is typically formed by using an interlock circuit (not shown) comprising relays. It is assumed here that it is coordinated with an upper system (not shown) for matching. The switching selection circuit 35 cooperates with a motor 31 as a drive source to form a drive section 39 having a selection feature. While the drive shaft 33 is made to run in parallel with the transmission shaft 32 of the operating mechanism in the arrangement of FIG. 20, the positions of the gears of the drive shaft 33 are shifted from those of the gears of the transmission shaft 32. Thus, when one of the gears are engaged, all the remaining gears are disengaged. Each of the gears may be provided with a part that is free from a tooth so that the gear can be engaged at the part that is free from a tooth to complete the engagement.

As one of the devices to be operated is selected by means of the switching selection circuit 35, it is possible to move a coupling 34 if the interlocking condition is satisfied. Then, the drive shaft 33 is moved to a predetermined axial position to make it possible to drive the target device (such as a disconnector and maintenance earthning switch) to operate. As the device to be driven is selected by means of the switching selection circuit 35 and a handle 36 is inserted, the device can be driven to operate if the interlocking condition is satisfied.

Figure 21:
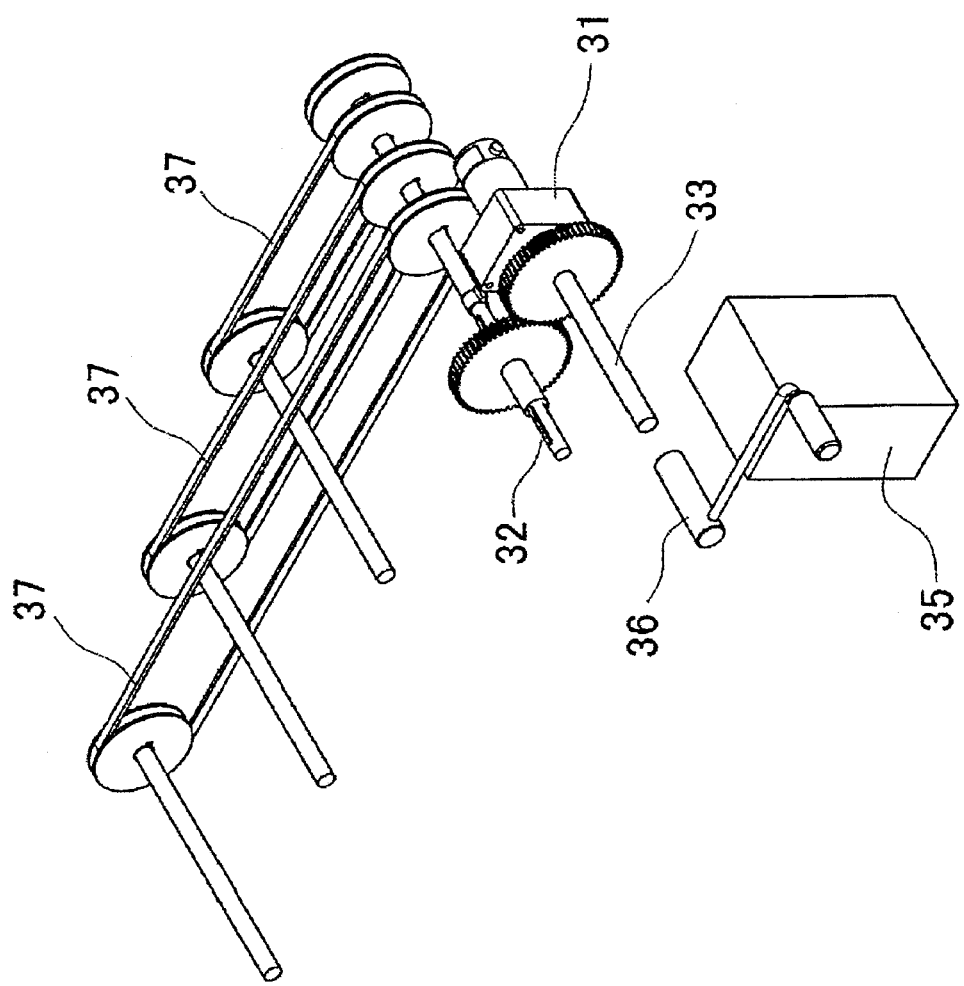
FIG. 21 is a schematic exploded perspective view of an alternative operating mechanism that can also be used for the third embodiment of gas insulated switchgear according to the present invention.

FIG. 21 is a schematic exploded perspective view of an alternative operating mechanism that is different from the one shown in FIG. 20 and can also be used for the third embodiment of gas insulated switchgear. With the arrangement of FIG. 21, the drive shaft 33 and the transmission shaft 32 are made to run in parallel with each other. As the switching selection circuit 35 is operated for selection, the drive shaft 33 is axially moved and one of the belt driving gears is selected and engaged. A belt 37 is connected to the gears of the transmission shaft 32 so that the target device (such as a disconnector and maintenance earthning switch) can be driven to operate.

With this embodiment, it is possible to employ the drive source 31 as a common component of the operating mechanisms 4M, 6M, 12M, 18M of all the disconnector and maintenance earthning switches of the feeder line and so on. Additionally, it is possible to arrange these components in a concentrated manner without obstructing inspecting operations. Then, it is possible to further improve the economy of the switchgear and omit the interlock circuit that is arranged in known switchgears to prevent the disconnector and maintenance earthning switches thereof from operating simultaneously. Still additionally, since a single handle is provided, the efficiency of operator can be further improved.

Although not described above, the order or arrangement of the operating mechanisms of the disconnector and maintenance earthning switch and so on can be altered by altering the positions where they pass the respective links. While the transformers of instruments for gauging the voltages and the electric currents of circuits are not described above, the metering terminals of such devices can be connected to the control panel by way of the low voltage control cable 22 as in the case of the prior art to provide the above-described advantages or equivalents.

Numerous modifications and variations of the present invention are possible in light of the above teachings. It is, therefore, to be understood that, within the scope of the appended claims, the present invention can be practiced in a manner other than as specifically described herein.

What is claimed is:

1. A gas insulated switchgear comprising:

circuit breakers of three phases;

circuit breaker vessels of the phases for containing the respective circuit breakers of the three phases separately, the vessels being installed horizontally substantially in parallel with each other, each of the vessels having first and second branching sections of the corresponding phase and being arranged separated from each other in the longitudinal direction of the circuit breaker, insulating gas being filled in the vessels and held in a hermetically sealed condition;

first bus bars of the three phases, the first bus bar of each phase being connected to the first branching section of the circuit breaker vessel of the phase;

first disconnector and maintenance earthning switches of the three phases, at least a first disconnector and maintenance earthning switch being provided for each phase, the first disconnector and maintenance earthning switch or switches of each phase being connected to the first bus bar of the phase and also to main bus bars of the phase extending in a direction different from the longitudinal direction of the circuit breaker of the phase;

second bus bars of the three phases, the second bus bar of each phase being connected to the second branching section of the circuit breaker vessel of the phase;

second disconnector and maintenance earthning switches of the three phases, the second disconnector and maintenance earthning switch of each phase being connected to the second bus bar of the phase, insulating gas being filled in the second disconnector and maintenance earthning switches in a hermetically sealed condition;

circuit breaker operating mechanisms of the three phases arranged separately, the circuit breaker operating mechanism of each phase being connected substantially onto a linking/connection section of the longitudinal end located close to the first branching section of the circuit breaker vessel of the phase;

first disconnector and maintenance earthning switch operating mechanisms of the three phases for operating the first disconnector and maintenance earthning switches of the three phases;

second disconnector and maintenance earthning switch operating mechanisms of the three phases for operating the second disconnector and maintenance earthning switches of the three phases;

first disconnector and maintenance earthning switch operation links of the three phases for connecting respectively the first disconnector and maintenance earthning switches and the first disconnector and maintenance earthning switch operating mechanisms of the three phases; and second disconnector and maintenance earthning switch operation links of the three phases for connecting respectively the second disconnector and maintenance earthning switches and the second disconnector and maintenance earthning switch operating mechanisms of the three phases, wherein the second disconnector and maintenance earthning switch operation links of the three phases being arranged so as to pass through inter-phases of the first bus bars, and an operating panel of the circuit breaker operating mechanism, an operating panel of the first disconnector and maintenance earthning switch operating mechanism and an operating panel of the second disconnector and maintenance earthning switch operating mechanism of each phase being substantially arranged in a common flat plane horizontally and in parallel with each other.

2. The gas insulated switchgear according to claim 1, wherein the first disconnector and maintenance earthning switch operating mechanisms and the second disconnector and maintenance earthning switch operating mechanisms are arranged in parallel with each other above the circuit breaker operating mechanisms.

3. The gas insulated switchgear according to claim 1, further comprising:

circuit breaker gas gauges of three phases, each being connected to the circuit breaker vessel of the corresponding phase by piping and adapted to display condition of the insulating gas in the inside of the circuit breaker vessel;

first disconnector and maintenance earthning switch gas gauges of the three phases, the first disconnector and maintenance earthning switch gas gauge of each phase being connected to the first disconnector and maintenance earthning switch of the phase by piping and adapted to display condition of the insulating gas in the inside of the first disconnector and maintenance earthning switch; and second disconnector and maintenance earthning switch gas gauges of the three phases, the second disconnector and maintenance earthning switch gas gauge of each phase being connected to the second disconnector and maintenance earthning switch of the phase by piping and adapted to display condition of the insulating gas in the inside of the second disconnector and maintenance earthning switch, wherein pipeworks connecting the second disconnector and maintenance earthning switches and the second disconnector and maintenance earthning switch gas gauges are arranged so as to pass through inter-phases of the first bus bars; and instrument surfaces of the circuit breaker gas gauges, the first disconnector and maintenance earthning switch gas gauges and the second disconnector and maintenance earthning switch gas gauges are aligned substantially in the common flat plane with the operating panels of the circuit breaker operating mechanisms, the first disconnector and maintenance earthning switch operating mechanisms and the second disconnector and maintenance earthning switch operating mechanisms.

4. The gas insulated switchgear according to claim 3, wherein the first disconnector and maintenance earthning switch operating mechanisms, the second disconnector and maintenance earthning switch operating mechanisms, the circuit breaker gas gauges, the first disconnector and maintenance earthning switch gas gauges and the second disconnector and maintenance earthning switch gas gauges of the three phases are arranged in parallel with each other above the circuit breaker operating mechanisms of the three phases.

5. The gas insulated switchgear according to claim 3, wherein operating surfaces of the operating panels of the circuit breaker operating mechanisms, the first disconnector and maintenance earthning switch operating mechanisms and the second disconnector and maintenance earthning switch operating mechanisms of the three phases as well as the instrument surfaces of the circuit breaker gas gauges, the first disconnector and maintenance earthning switch gas gauges and the second disconnector and maintenance earthning switch gas gauges of the three phases are arranged within a range where a single operator can monitor and control them without moving.

6. The gas insulated switchgear according to claims 3, wherein
operating surfaces of the operating panels of the circuit breaker operating mechanisms, the first disconnector and maintenance earthning switch operating mechanisms and the second disconnector and maintenance earthning switch operating mechanisms of the three phases as well as the instrument surfaces of the circuit breaker gas gauges, the first disconnector and maintenance earthning switch gas gauges and the second disconnector and maintenance earthning switch gas gauges of the three phases are arranged within a range of height not greater than 170 cm and a range of width of height not greater than 70 cm and a range of horizontal width not greater than 180 cm.

7. The gas insulated switchgear according to any one of claim 1, wherein
wherein the linking/connection section is a removable linking section having a width smaller than any of the circuit breaker vessels and the circuit breaker operating mechanisms of the three phases is arranged between the circuit breaker vessel and the circuit breaker operating mechanism of each phase.

8. The gas insulated switchgear according to any one of claim 1, wherein
the first disconnector and maintenance earthning switch operating mechanisms and the second disconnector and maintenance earthning switch operating mechanisms of the three phases as well as the circuit breaker gas gauges, the first disconnector and maintenance earthning switch gas gauges and the second disconnector and maintenance earthning switch gas gauges of the three phases are integrated with an local control panel for controlling/monitoring the feeder line.

9. The gas insulated switchgear according to claim 8, wherein
the local control panel includes:
a drive source capable of commonly driving the first disconnector and maintenance earthning switch operating mechanisms and the second disconnector and maintenance earthning switch operating mechanisms; and
a selection circuit for operating one of the first disconnector and maintenance earthning switch operating mechanisms and the second disconnector and maintenance earthning switch operating mechanisms.

10. The gas insulated switchgear according to claim 1, wherein
the first disconnector and maintenance earthning switch operating mechanism and the second disconnector and maintenance earthning switch operating mechanism of each phase are contained in a common cabinet and formed as an individually removable operating equipment module.

* * * * *